Figure 2A:
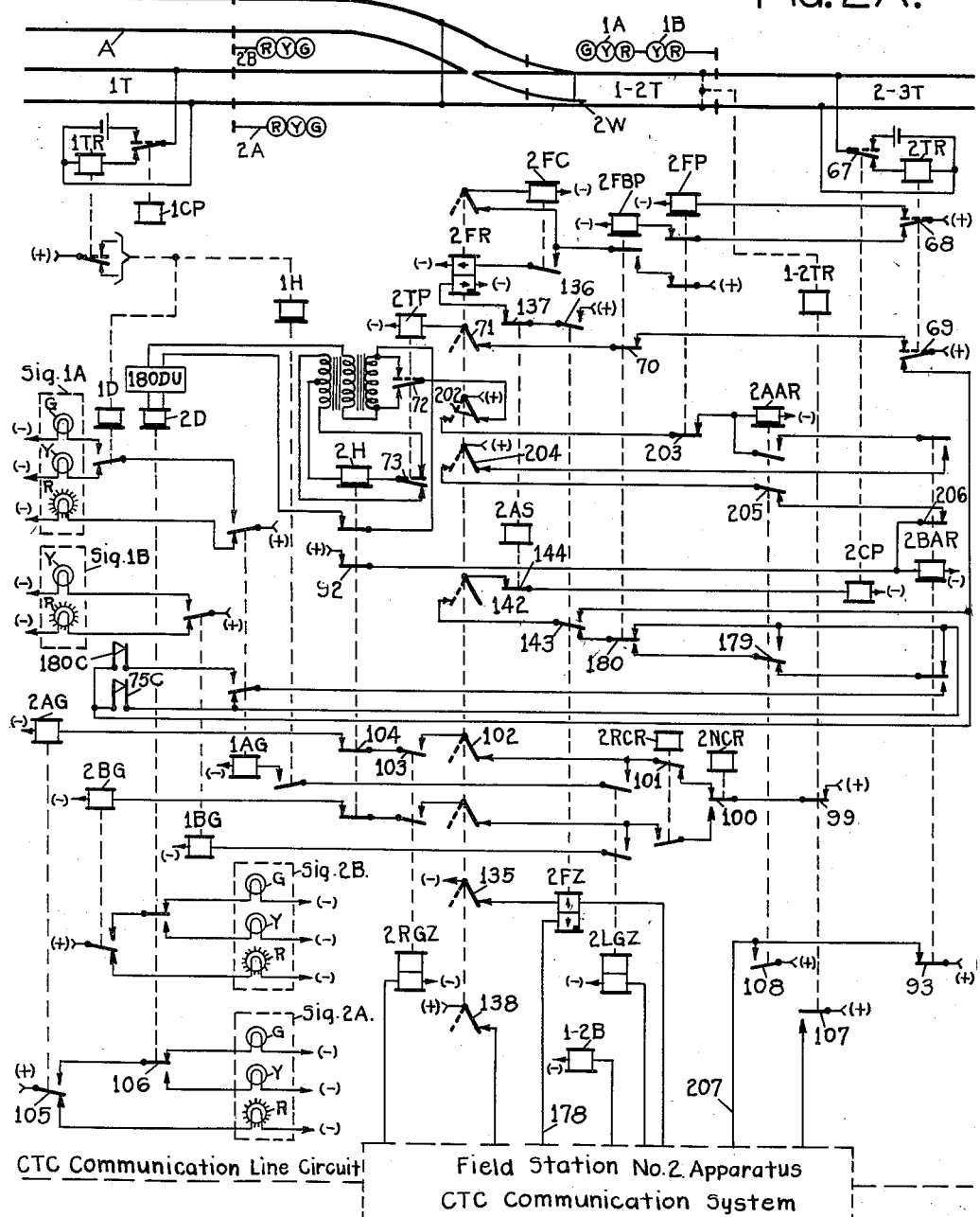
Figure 2B:
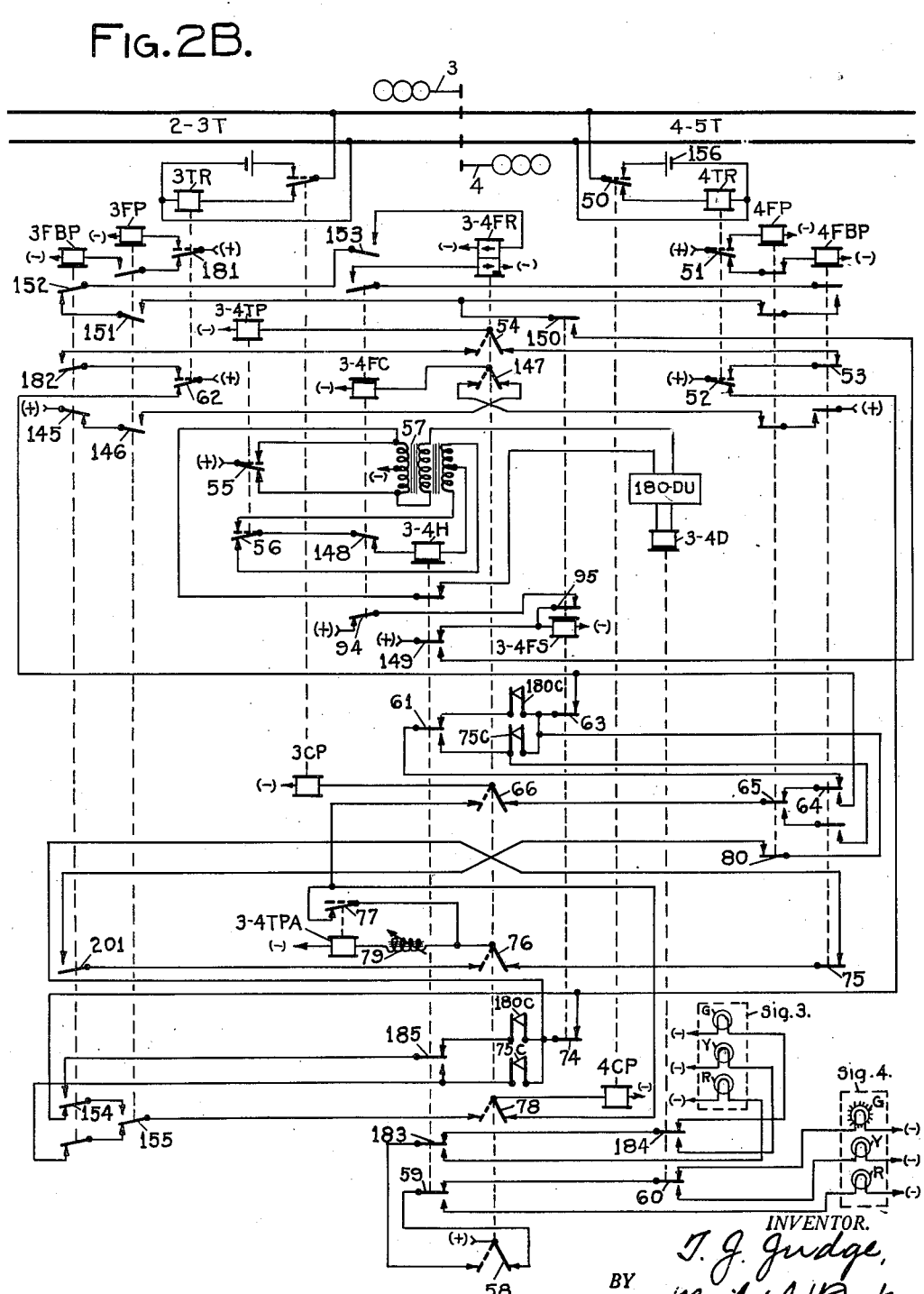
Figure 2D:
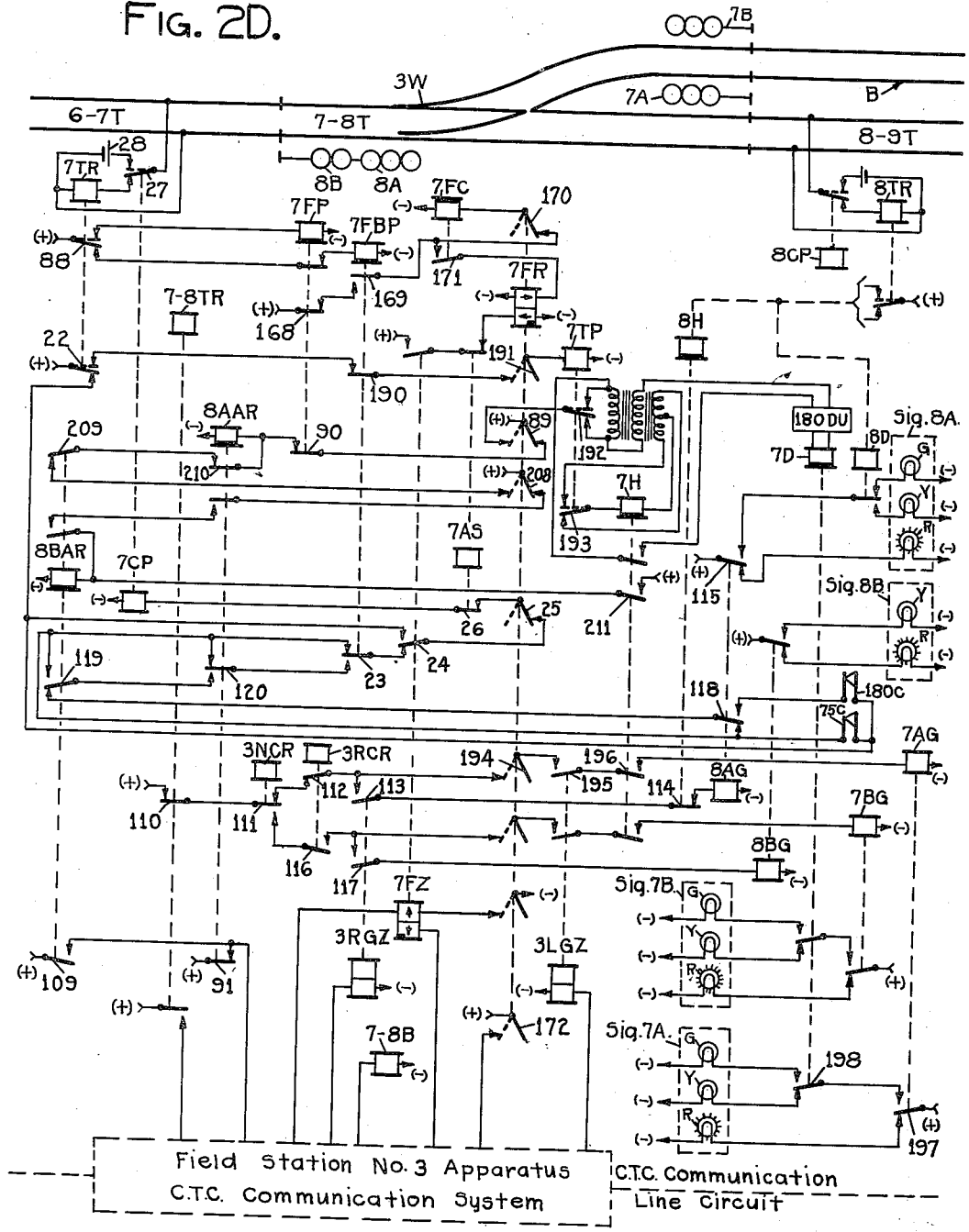

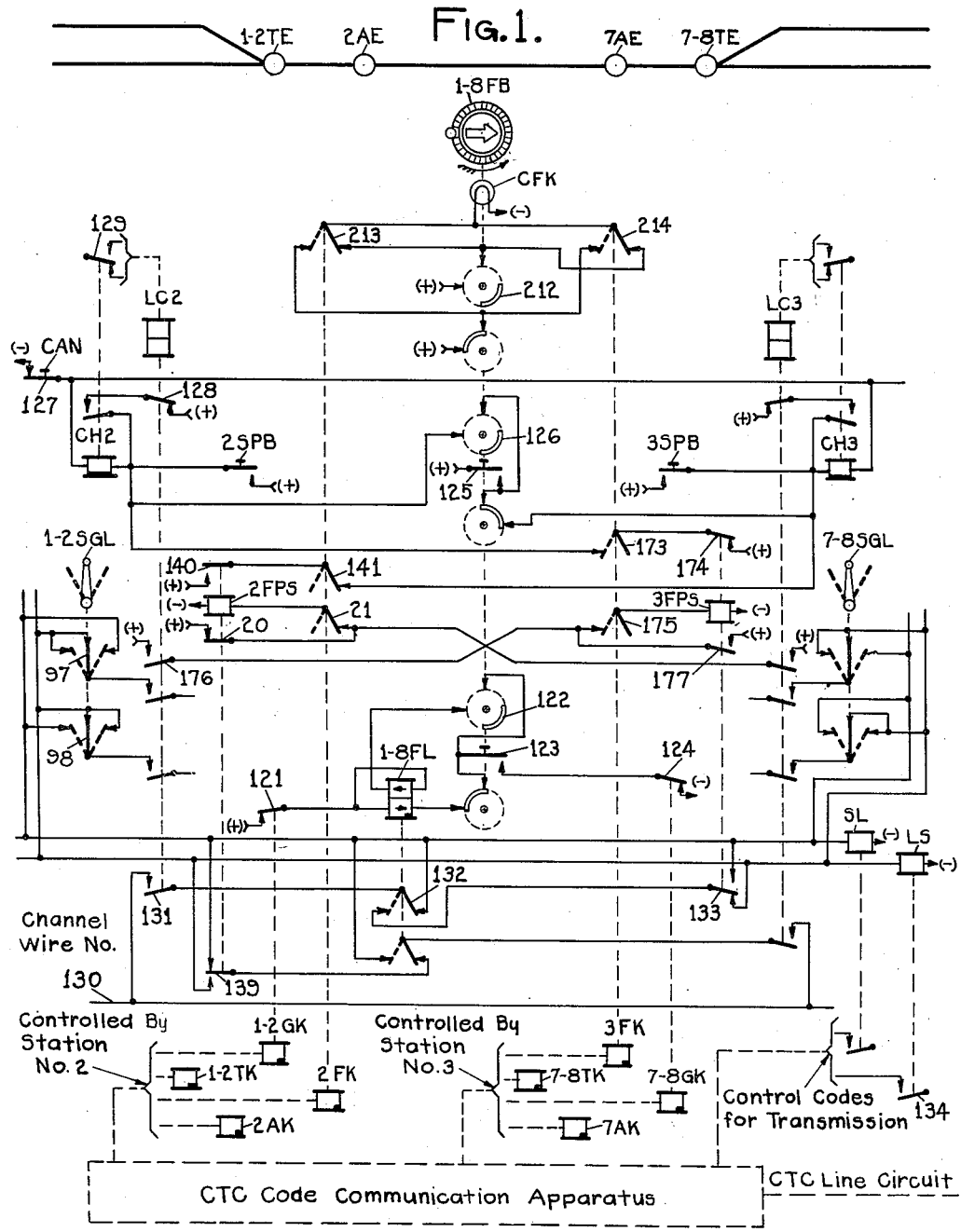

Nov. 4, 1952

T. J. JUDGE 2,617,014

TRAFFIC DIRECTION CONTROL FOR CODED TRACK
CIRCUIT SIGNALING SYSTEMS

Filed Aug. 15, 1946

7 Sheets-Sheet 2

INVENTOR.
T. J. Judge,
BY Neil W. Preston,
HIS ATTORNEY

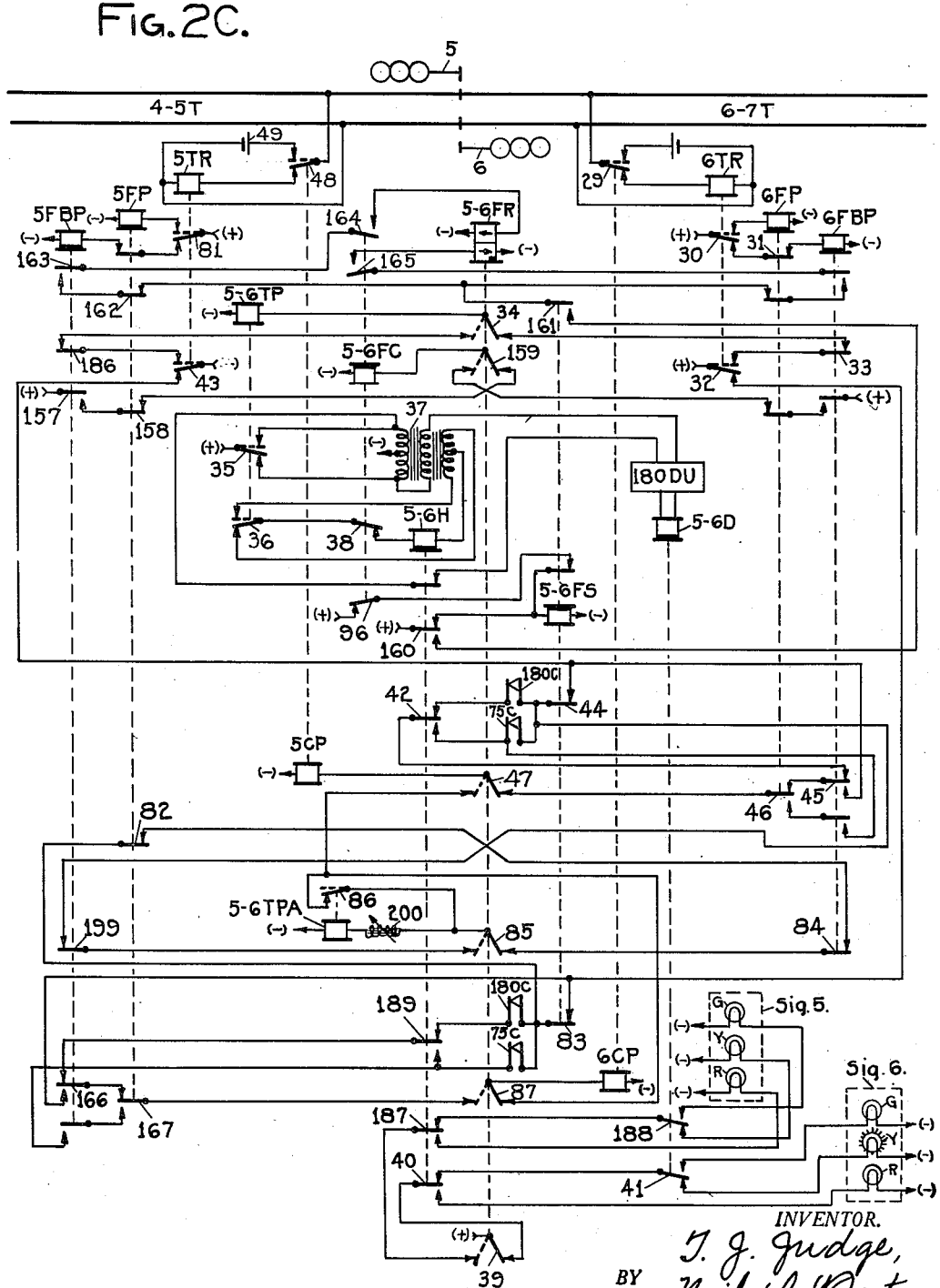

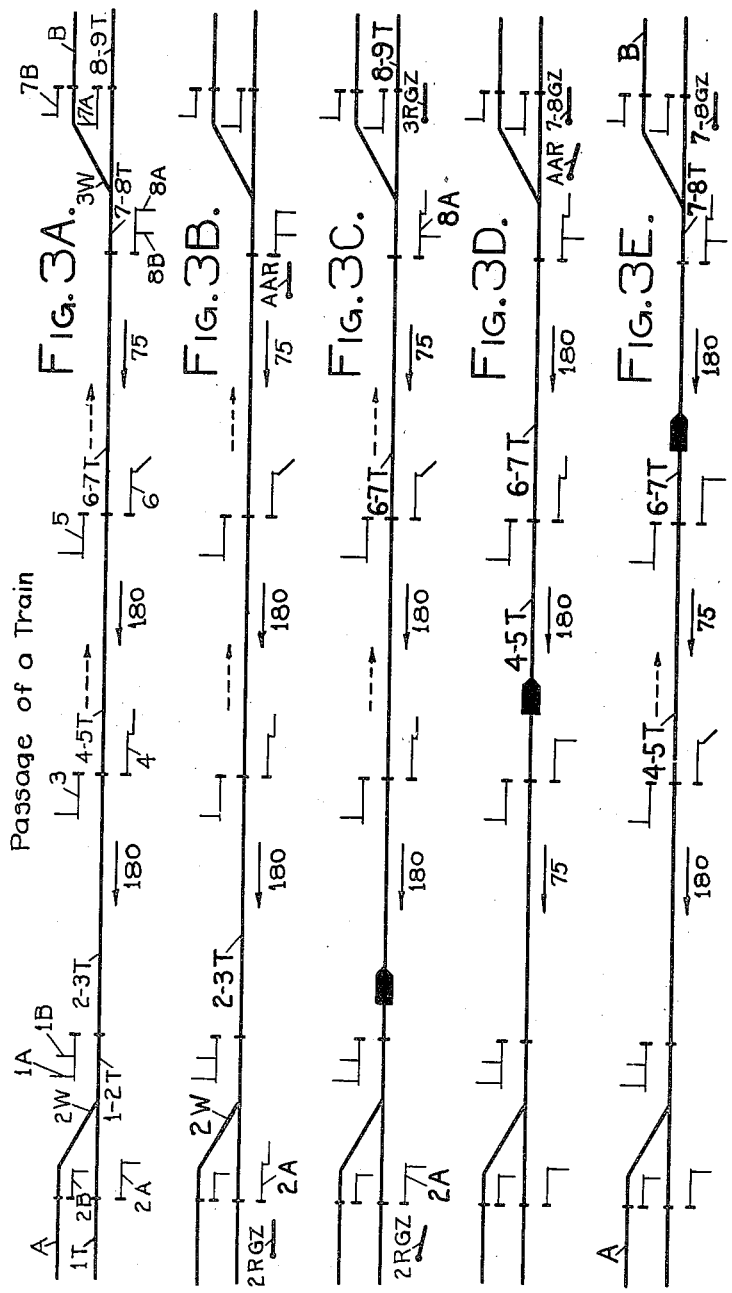
Nov. 4, 1952  T. J. JUDGE  2,617,014
TRAFFIC DIRECTION CONTROL FOR CODED TRACK
CIRCUIT SIGNALING SYSTEMS
Filed Aug. 15, 1946  7 Sheets-Sheet 6
INVENTOR.
T. J. Judge,
BY Neil L. Preston,
HIS ATTORNEY.

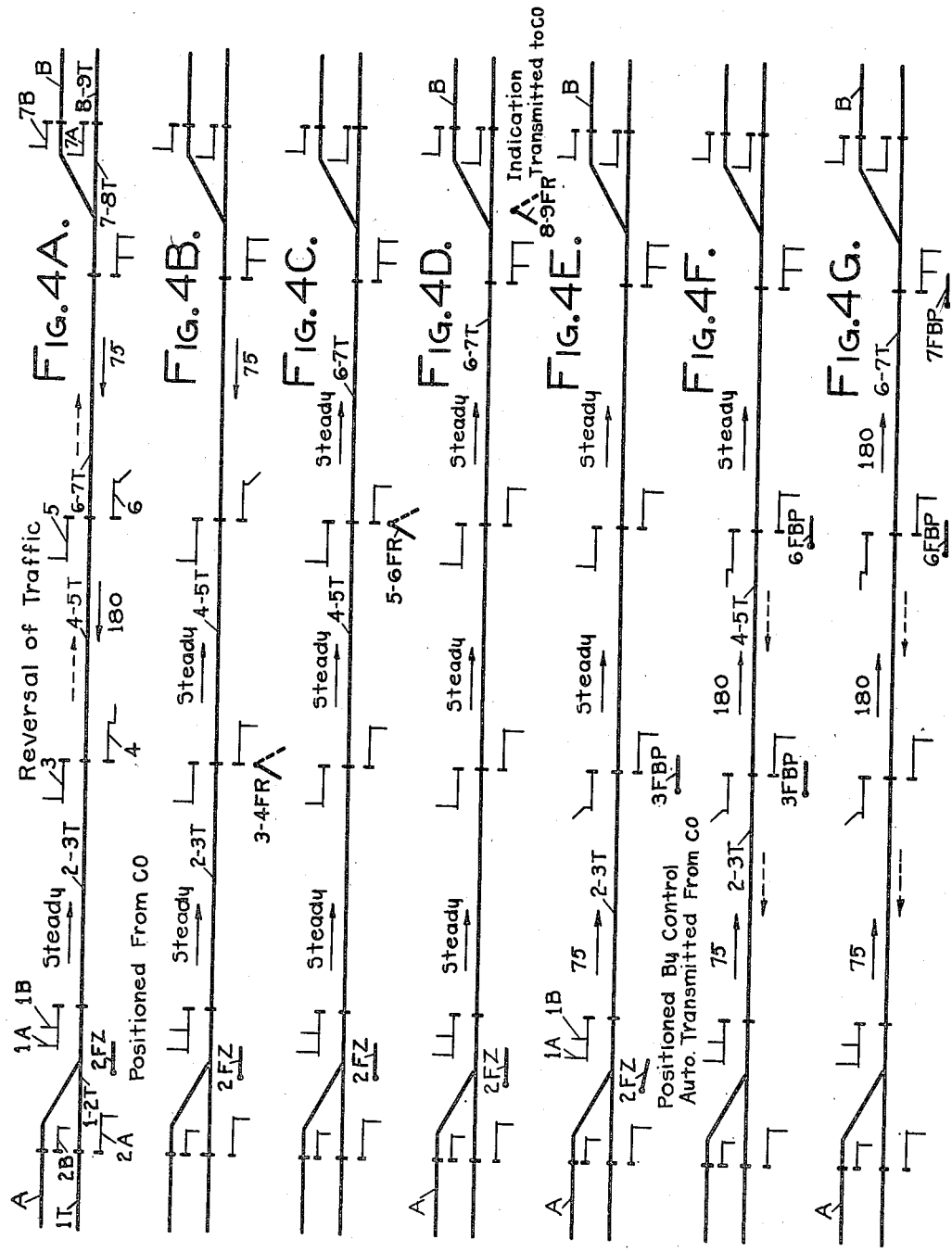

UNITED STATES PATENT OFFICE 2,617,014

TRAFFIC DIRECTION CONTROL FOR CODED TRACK CIRCUIT SIGNALING SYSTEMS

Thomas J. Judge, Rochester, N. Y., assignor to General Railway Signal Company, Rochester, N. Y.

Application August 15, 1946, Serial No. 690,619

14 Claims. (Cl. 246—3)

This invention relates to coded track circuit signalling systems for railroads, and it more particularly pertains to improvements in coded track circuit signalling systems of the character disclosed in my prior Patent No. 2,357,519, dated September 5, 1944.

The present invention provides for the control of traffic through a stretch of single track by an operator at a remote control office, track switch and signal and traffic direction apparatus located at the ends of the stretch being preferably controlled from the control office by a code communication system. Thus, according to the general organization of the system, the signals at the ends of the stretch are governed from the control office, subject to automatic coded track circuit control dependent upon the condition of occupancy by a train of various blocks, or track sections, in advance of the signals. The switch and signal control apparatus located at each end of the stretch is said to be located at a field station, and each field station is connected to a centralized traffic control line circuit extending to the control office as a part of the code communication system. The signals governing entrance to the stretch for both directions of traffic, as well as intermediate signals in the stretch, are governed by distinctive "driven codes" transmitted through the track rails to such signals, and at times "inverse," or "off" codes are transmitted from the exit ends of certain of the track sections for use in the provision of approach control.

An object of the present invention is to provide an improved means for reversing the direction of traffic established through a stretch of track in response to the manual designation by an operator at the control office of a change in traffic direction, such reversal in direction being accomplished without the use of inverse codes, as the inverse codes are required for approach control purposes.

Generally speaking, and without attempting to define the scope of the present invention, the coded track circuits remain coding after the passage of a train for the last established direction of traffic, and a change in the direction of traffic is initiated by an operator at the control office by the rotation and depression of a traffic control button, or other suitable manually operable traffic direction designation means.

The depression of the traffic control button, after its rotation to designate a change in direction of traffic, initiates the code communication system to transmit a control to the field station at the entrance end of the stretch, according to the last established traffic direction, for rendering the track circuit code transmitting apparatus at that end active to apply steady energy to the track rails as a distinctive track circuit control for shifting traffic direction relays at the next signal location in advance, and thus render the steady energization of the respective blocks in advance successively through the entire stretch of track to prove that the stretch is unoccupied by a train.

The reception of the steady energization in the track rails at the field station at the opposite end of the stretch proves that the stretch is unoccupied by a train and transmits such indication to the control office. The reception at the control office of the indication that the stretch is unoccupied automatically initiates the code communication system into a cycle of operation for transmission of a code to the entrance end of the stretch, according to the previously established direction of traffic, to remove the steady energy from the track rails at that end and start the transmission of driven codes through the respective track sections to establish the new direction of traffic.

Another object of the present invention is to so arrange the traffic direction control organization at the ends of the blocks that the last established direction of traffic is maintained by magnetic-stick relays in case of an interruption of power.

Another object of the present invention is to provide a means by which signals governing traffic through a stretch of track are maintained at stop if a change in traffic direction is initiated without being manually designated by the dispatcher, such, for example, as by a signal maintainer applying steady energy across the track rails in testing.

Another object of the present invention is to indicate at the control office an out-of-correspondence condition between the manual traffic direction designation means and the condition of the traffic direction control apparatus in the field, and thus indicate to the dispatcher any condition where a change in traffic direction which has been initiated cannot be completed.

Another object of the present invention is to provide a traffic direction control system in which no signal can be cleared, either automatically or by any act of the dispatcher, for a newly designated traffic direction if a train is occupying any track section within the limits of the stretch of track subject to traffic direction control.

Other objects, purposes, and characteristic features of the present invention will be in part obvious from the accompanying drawings and in part pointed out as the description of the invention progresses.

In describing the invention in detail, reference will be made to the accompanying drawings in which those parts having similar features and functions are designated through the several illustrations by like letter reference characters which are generally made distinctive by reason of preceding numerals indicative of the particular function with which such parts are associated, and in which:

Fig. 1 illustrates control office apparatus for the transmission and reception of respective controls and indications by a code communication system;

Figs. 2A through 2D when placed side by side respectively illustrate the circuits employed for the control of signals and traffic direction control apparatus of this embodiment of the present invention;

Figs. 3A through 3E illustrate by track diagrams the general mode of operation of the system provided by the present invention upon the passage of a train; and, Figs. 4A through 4G illustrate by track diagrams the general mode of operation of the system upon reversing the direction of traffic.

The illustrations employed in the disclosure of this embodiment of the present invention are arranged as schematic wiring diagrams for the purpose of facilitating the disclosure as to the mode of operation and principles involved in the system without attempting to illustrate the specific construction and arrangement of parts that would be employed in practice. Thus, the relays and their contacts are shown in a conventional manner, certain relays being shown in block form only and reference being made to the prior art for a more detailed disclosure as to their mode of operation. Rather than illustrate all sources of energy in detail, the symbols (+) and (—) are employed to indicate the respective positive and negative terminals of a suitable source of direction current.

The signal symbols used in the diagrams of Figs. 3A through 3E and 4A through 4G are to be considered as indicative of the indications of the signals rather than the type of signals employed, the signals employed in this embodiment of the present invention being of the color light type having individual color light units.

In order to simplify the description of the present invention, a general reference is made from time to time to functions common to all parts having similar functions by use of letter reference characters without their preceding numerals, and such references to be considered as applicable to any apparatus falling into such classification, irrespective of the numerals preceding the letter reference characters of such apparatus.

The trackway for this embodiment of the present invention as illustrated in Figs. 2A through 2D, is divided into blocks, each block having an entering signal for each direction of traffic. For simplification of the present disclosure, only a single track section is included in each block, but it is to be understood that more than one track section can be employed in accordance with the requirements of practice. It is also to be understood that the track layout employed in this embodiment of the present invention is to be considered as a typical and simplified track layout to facilitate the disclosure of the present invention, and that the system is readily adaptable to track layouts of a modified nature having different number of track sections and signals involved.

The arrangement of the signals at the ends of the single track stretch is provided in accordance with the usual practice in centralized traffic control whereby an OS detector track section is provided for a track switch at each end of each passing siding such as the track section 1–2T at the right-hand end of the passing siding A, and the track section 7–8T at the left-hand end of the passing siding B. The stretch of single track extending between the passing sidings A and B is illustrated as divided into the three track sections 2–3T, 4–5T, and 6–7T.

The signals employed in this embodiment of the present invention are of the color light type having individual color light units for providing respective stop, caution and clear indications in accordance with the illumination of red, yellow and green lamps. It is to be understood, however, that other types of signals, such as searchlight signals, semaphore signals or position light signals could as well be employed in accordance with the requirements of practice.

The arrangement of the signals is such that the signals 2A and 2B are provided for governing entrance to the stretch of single track at the left-hand end of the stretch, and the signals 7A and 7B are provided for governing entrance to the stretch of track at the right-hand end. The signals 1A and 1B, and 8A and 8B are leaving signals with respect to traffic through said stretch at the respective left-hand and right-hand ends of the stretch. All signals at the ends of the stretch are subject to the control of a dispatcher at the control office as well as the automatic control through the track circuits, and thus such signals are normally at stop in accordance with the usual practice in centralized traffic control systems.

The automatic signals 4 and 6 are provided for governing entrance to the track sections 4–5T and 6–7T respectively for east bound traffic, and the signals 3 and 5 are provided for governing entrance to the track sections 2–3T and 4–5T respectively for west bound traffic. The control of such signals is automatic in accordance with track circuit codes transmitted through the track rails of the track sections in advance.

Each of the track sections in the stretch of track between the passing sidings A and B has a coded track circuit which includes a track battery and a code following track relay TR at each end of that track section. For the purpose of obtaining the best operating conditions of each code following track relay, it is desirable that such relay be of the biased polar type having a polar structure so arranged as to cause the relay contacts to be biased to a deenergized position from which they can be moved only upon energization of the relay windings with a particular polarity.

A code transmitter relay CP is provided at each end of each of the track sections having a coded track circuit for the transmission of track circuit codes, such relay being effective when rendered active to transmit code pulses formed by suitable code oscillators, or other code pulse forming means, at a 180 or 75 code rate. A suitable code oscillator is shown, for example, in the patent to O. S. Field, No. 2,351,588, dated June 20, 1944. It is preferable that each of the code transmitter relays CP be of the biased polar type to provide improved operating characteristics, particularly where such relays are used for the transmission of inverse codes.

Code receiving means responsive to the pulsing of the track relay TR at each end of each of the track sections having a coded track circuit comprising a track repeater relay TP, which is a code following relay, a front contact repeater relay FP sufficiently slow acting to be maintained steadily picked up in accordance with the pulsing of the associated track relay TR, a front-back repeater relay FBP which is sufficiently slow acting to be maintained steadily picked up upon the reception of a track circuit code by the associated relay TR, a decoding transformer, a slow acting relay H energized by the decoding transformer so as to be maintained steadily picked up upon the reception of a track circuit code, and a distant control relay D energized from the decoding transformer through a tuned circuit and rectifier 180DU so as to be steadily picked up only in response to a 180 code. For the purpose of reducing to a minimum the equipment required at the intermediate signal locations, certain of the above-described code receiving apparatus is selectively controlled so as to be employed for both directions of traffic. Thus, at each intermediate signal location, the relays TP, H and D are selectively controlled to be associated with either track section at such intermediate signal location.

A relay TPA is provided at intermediate signal locations as required for the transmission of inverse code pulses, a single relay TPA being selected to be used for both directions of traffic at an intermediate signal location for cooperating with a track relay TR to determine the length of the inverse code pulses transmitted from that signal location.

A traffic direction relay FR is provided at each end of the stretch of single track and at each intermediate signal location for the purpose of selecting the control of the above described code transmitting and receiving apparatus in accordance with traffic direction designated by a dispatcher at the control office. Each relay FR is of the two position magnetic-stick type which is characterized by maintaining its contacts in its last operated position until energy of the opposite polarity is applied to that relay. By using a relay having these characteristics for traffic direction control, the last established direction is always maintained in case of a power interruption. In addition to the traffic direction control relay 5–6FR (see Fig. 2C) for the typical intermediate location illustrated, a slow pick up directional stick relay 5–6FS is provided for governing code transmission. This relay permits the transmission of track circuit code in one track section, provided that a track circuit code is being received through the track rails of the adjoining track section. Another slow pick up relay 5–6FC is provided at the typical intermediate signal location illustrated in Fig. 2C for cooperating with the magnetic stick relay 5–6FR upon changing the direction of traffic.

Although the apparatus associated with the code communication of switch and signal and traffic control from the control office to the respective field stations, and the transmission of indications from such field stations to the control office as to the conditions of the apparatus, is not fully disclosed in the drawings, reference is to be made for a complete disclosure of such apparatus to the prior application of Hailes et al., Ser. No. 484,728, dated April 27, 1943, which has resulted in Patent No. 2,399,734, dated May 7, 1946. The parts of the code communication system shown in the accompanying drawings have been arranged to cooperate with the system disclosed in that Hailes et al. application, although it is to be understood that other types of code communication systems can as well be employed.

With reference to Fig. 1, certain parts of the control machine at the control office are illustrated comprising a miniature diagram of the track layout for which this embodiment of the invention is provided, such diagram having associated therewith OS track indicator lamps 1–2TE and 7–8TE for the OS track sections at the respective left-hand and right-hand ends of the stretch of single track, and the lamps 2AE and 7AE for indicating the approach of trains to the respective left-hand and right-hand ends of the stretch.

Traffic direction control button 1–8FB is conveniently located near the miniature track diagram for controlling the direction of traffic through the stretch. The button 1–8FB that is illustrated is of the rotary type having an arrow included in the button for indicating the direction of traffic. The button 1–8FB is operable by rotation through 180° to change the direction of traffic, and it also has contacts closed upon the depression of the button, such contacts being used in initiating the transmission of a control by the code communication system for causing a change in the direction of traffic. The traffic direction button 1–8FB can be, for example, of the general character disclosed in patent to J. F. Merkel, Patent No. 2,305,185, dated December 15, 1942. It is to be understood that various other types of manually operable control buttons or levers could as well be employed in accordance with the requirements of practice.

The out-of-correspondence lamp CFK, which is energized when the traffic direction arrow of the button 1–8FB is out of correspondence with the direction of traffic actually established in the field, is preferably mounted in the rear of the button 1–8FB for causing the illumination of the center portion of that button when such lamp is energized.

The slow acting relays CH2 and CH3 are change, or start, relays for the transmission of switch and signal and traffic direction controls to the respective field stations No. 2 and No. 3, and the picking up of either of such relays causes the picking up of an associated relay LC for connecting the respective channels of the code communication system to control code determining relays SL and LS as selected by switch and signal and traffic direction control contacts.

A traffic locking relay 1–8FL of the magnetic-stick type is provided at the control office for the purpose of allowing the transmission of controls to the field for a change in the direction of traffic only if the signals governing entrance at the respective ends of the stretch are indicated at the control office as being at stop.

A relay FPS is provided at the control office for each end of the stretch for use in connection with the mode of operation of the system upon the reversal in the direction of traffic. Such relay is of the neutral type and is maintained picked up only by energization of its pickup or stick circuit.

The magnetic-stick relays 1–2GK, 2FK, 2AK and 1–2TK are conditioned in accordance with the reception of indications communicated from the field station No. 2 to the control office. Similarly, the relays 7-8GK, 3FK, 7AK and 7-8TK are of the magnetic-stick type and are conditioned in accordance with the communication of indications from the field station No. 3 to the control office.

The part of the code communication system located at field station No. 2 for the reception of controls and the transmission of indications is indicated in block form in Fig. 2A as reference is to be made to the above-mentioned application of Hailes et al. for a complete disclosure as to the organization of such apparatus. Thus, for the purpose of disclosure of the present invention, it is assumed that the relay 2RGZ is picked up at the field station No. 2 in response to the transmission of a control from the control office for clearing a signal governing traffic to the right, and similarly, the relay 2LGZ is picked up in response to the transmission of a control from the control office for clearing a signal governing traffic to the left. The relay 1-2B is responsive only to the transmission of a code from the control office for restoration of a signal at field station No. 2 to stop.

The traffic control relay 2FZ is of the magnetic-stick type and it is controlled through the medium of the code communication system from the control office in a manner to be more readily understood as the description progresses.

It is to be understood that a similar arrangement of apparatus to that which has been described as associated with field station No. 2 is provided at field station No. 3. Thus, with reference to Fig. 2D, the relays 3RGZ and 3LGZ are responsive to control codes transmitted from the control office for clearing signals governing east bound and west bound traffic respectively, and the magnetic-stick relay 7FZ is conditioned from the control office as required in the control of the establishment of traffic direction.

According to usual practice in centralized traffic control systems, each of the track switches W has associated therewith respective normal and reverse switch correspondence relays NCR and RCR. These relays are energized only when the associated track switch is in its respective normal or reverse position in correspondence with the switch position that has been last called for by the code communication system. Thus, the relays 2NCR and 2RCR (see Fig. 2A) are associated with the track switch 2W, and the relays 3NCR and 3RCR are associated with the track switch 3W.

Having thus considered the general structural organization of the system, it is believed that an understanding of the circuit organization can best be understood by a consideration of various typical operating conditions of the system to be encountered in practice.

Operation

*General.*—A consideration of the general mode of operation of the system before making specific reference to the circuit organization for providing such mode of operation will be considered with reference to the track diagrams of Figs. 3A through 3E, and Figs. 4A through 4G.

With reference to Fig. 3A, the conditions hereinafter referred to as the normal conditions of the system are illustrated in which the direction of track circuit code transmission is maintained in accordance with the last established direction of traffic for the passage of east bound trains.

Under the normal conditions of the system the signals associated with the respective field stations No. 2 and No. 3 are at stop, and thus in accordance with signal 8A being at stop, and the last direction of traffic being established for east bound trains, a 75 driven code is transmitted from right to left in the track section 6-7T to provide a control for the intermediate signal 6 to cause that signal to indicate caution. With the signal 6 at caution, a 180 driven code is transmitted from right to left in the track section 4-5T in the rear of that signal to cause the signal 4 to be clear. In accordance with the clear indication of signal 4, a 180 driven code is transmitted from right to left in the track section 2-3T in the rear of that signal to provide a means for clearing the signal 2A, or the signal 2B, if a control is communicated from the control office for the clearing of either of such signals. It will be noted that an inverse code is shown as being transmitted from left to right in the track sections 4-5T and 6-7T for the purpose of providing approach control for the signals 8A and 8B.

With reference to Fig. 3B, it is assumed that a control is communicated from the control office for the clearing of a signal at field station No. 2 for governing traffic to the right, with the track switch 2W in its normal position. The reception of such control at field station No. 2 causes the picking up of the relay 2RGZ, and the picking up of that relay, allows the signal 2A to clear in accordance with the reception of the 180 driven code transmitted from right to left in the track section 2-3T in advance of that signal.

With reference to Fig. 3C, it is assumed that an east bound train has accepted the signal 2A, and the passage of such train has caused the restoration of the signal 2A to stop and the dropping away of the signal control relay 2RGZ, thus requiring the transmission of another control from the control office for again clearing the signal 2A for a following train. It has been assumed that the dispatcher at the control office has transmitted a control to the field station No. 3 for the clearing of signal 8A, thus causing the picking up of the relay 3RGZ at that field station and the clearing of signal 8A, assuming that a route has been established sufficiently in advance of that signal so that a 180 driven code is transmitted from right to left in the track section 8-9T for the clearing of that signal. Upon the clearing of signal 8A, the code rate is conditioned to be increased in the track section 6-7T from a 75 to a 180 code, but such increase can actually become effective only in the absence of inverse code in that track section.

Further progress of the east bound train is illustrated in Fig. 3D in which it is assumed that the train has entered the track section 4-5T and by entering such track section has caused a tumbledown of the inverse code through the track sections 4-5T and 6-7T to provide for the dropping away of the approach control relay AAR. The removal of the inverse code from track section 6-7T allows the increase in code rate in that track section to a 180 code.

With reference to Fig. 3E, the east bound train is assumed to have progressed to a point to occupy the track section 6-7T, with the track section 4-5T becoming unoccupied in the rear of the train to provide for the transmission of a 75 driven code from right to left in the track section 4-5T and the reestablishment of inverse code in that track section. As the train progresses further so as to leave the stretch of track between the passing sidings A and B, and leaves the OS track section 7-8T, the conditions of the signals and of track circuit code transmission are restored to the normal conditions illustrated in Fig. 3A.

With reference to Fig. 4A, the initial step is illustrated in the reversal in the direction of traffic through the stretch of track between the passing sidings A and B. This diagram illustrates that a dispatcher at the control office has caused the communication of a traffic direction change to field station No. 2 so as to cause the picking up of the magnetic-stick relay 2FZ. In accordance with the picking up of relay 2FZ a sequence of relay operations takes place by which steady energization is applied to the track rails at the left-hand end of the track section 2-3T to render the driven code transmitter inactive at the right-hand end of that track section.

With reference to Fig. 4B, it is illustrated that the reception of the condition of steady energization at the right-hand end of the track section 2-3T has become effective to operate the contacts of the magnetic-stick relay 3-4FR to their left-hand positions and thereby initiate the steady energization of the track rails of the track section 4-5T to suppress the transmission of driven codes at the right-hand end of that track section.

With reference to Fig. 4C, it is illustrated that the traffic direction relay 5-6FR has operated its contacts to their left-hand positions in accordance with the reception of steady energization at the right-hand end of the track section 4-5T, and such operation is illustrated as having been effective to apply steady energy to the track rails at the left-hand end of track section 6-7T.

With reference to Fig. 4D, it is illustrated that the reception of steady energy at the right-hand end of the track section 6-7T is effective to cause the relay 8-9FR to operate its polar contacts to their left-hand positions to complete the chain of events to check that the stretch of track between the passing sidings A and B is unoccupied by a train. In response to the shifting of the contacts of the relay 8-9FR, an indication is automatically transmitted to the control office of a change in the position of the contacts of that relay.

With reference to Fig. 4E, it is assumed that the control office has received the indication that the stretch of track is unoccupied between the passing sidings A and B, and in response to the reception of that indication, the apparatus at the control office is automatically initiated into a cycle of operation for transmission of a control to the field station No. 2 for causing the restoration of relay 2FZ to its dropped away position, and thus remove the condition of steady energization which has been applied to the track section 2-3T with the relay 2FZ in its picked up position. The combination of the relay 2FZ dropped away and the relay 2FR with its polar contacts in their left-hand positions, provides a selection which is effective to render the driven code transmitter at field station No. 2 active for the transmission of a driven code at a selected rate from left to right in the track section 2-3T. Thus, assuming the signals 1A and 1B to be at stop, a 75 driven code is transmitted from left to right in the track section 2-3T, and the reception of that code at the right-hand end of that track section is effective to cause the picking up of the code responsive relay 3FBP.

With reference to Fig. 4F, because of the picking up of the relay 3FBP in response to the 75 driven code transmitted from left to right in the track section 2-3T, the track circuit code transmitter at the left-hand end of the track section 4-5T is rendered active to transmit a 180 driven code, and the reception of such code at the right-hand end of the track section 4-5T causes the picking up of the code responsive relay 6FBP. Upon the reception of the code at the right-hand end of the track section 4-5T, the inverse code is established in that track section, and the reception of such inverse code at the left-hand end of that track section is effective to start the transmission of an inverse code in the track section 2-3T.

With reference to Fig. 4G, a condition is illustrated in which it is assumed that the picking up of the relay 6FBP has been effective to initiate the transmission of a 180 driven code in the track section 6-7T to cause the picking up of the code responsive relay 7FBP at the right-hand end of that track section and thus complete the establishment of driven code through the stretch of single track between the passing sidings A and B. The conditions thus established as illustrated in Fig. 4G will be readily recognized as comparable to the conditions illustrated in Fig. 3A and described as the normal conditions of the system except that such conditions are set up for the opposite direction of traffic.

*Normal conditions.*—With reference to Fig. 1, the normal conditions at the control office are considered to be those illustrated in which the signal control levers 1-2SGL and 7-8SGL are in their center positions, corresponding to the stop indications of the signals with which they are associated; and the relays associated with the communication of control codes to the field stations are normally deenergized, corresponding to the "at rest" conditions of the code communication system when it is inactive for the transmission of controls to the field stations.

The magnetic-stick relays 2FK and 3FK are positioned with their contacts operated to their right-hand positions in accordance with indications assumed to have been communicated to the control office from the respective field stations No. 2 and 3 in accordance with the last established direction of traffic.

The relay 2FPS is maintained picked up by its stick circuit in accordance with the east bound direction of traffic established, such stick circuit extending from (+) including front contact 20 of relay 2FPS, polar contact 21 of relay 2FK in its right-hand position, and winding of relay 2FPS, to (—).

At the field stations, the relays which are illustrated as being controlled by the code communication system are normally deenergized, and the relays FZ are assumed to have been last positioned so as to have their armatures operated to lower, or dropped away positions.

Each of the traffic direction relays FR in the field has its polar contacts operated to their right-hand positions in accordance with the last established direction of traffic to select the control of the track circuit code transmitting and receiving apparatus to establish track circuit codes transmitted in directions as shown in Fig. 4A, and as has been heretofore considered in a general manner.

The relay 1CP (see Fig. 2D) is active to transmit a 75 driven code by its energization for each pulse created by the oscillator contact 75C. The circuit by which relay 7CP is active extends from (+) including back contact 22 of relay 7TR, oscillator contact 75C, front contact 23 of relay 7FBP, back contact 24 of relay 7FZ, polar contact 25 of relay 7FR in its right-hand position, front contact 26 of the approach stick relay 7AS, and winding of relay 7CP, to (—). The pulsing of contact 27 of relay 7CP alternately connects the track battery 28 and the track relay 7TR across the track rails at the right-hand end of the track section 6–7T.

The reception of each driven code pulse at the left-hand end of the track section 6–7T energizes the relay 6TR (see Fig. 2C) through the back contact 29 of relay 6CP, and the pulsing of front contact 30 of the relay 6TR causes the relay 6FP to be maintained steadily picked up. With the relay 6FP picked up, the pulsing of back contract 30 of relay 6TR maintains the relay 6FBP steadily picked up by a circuit including front contact 31 of relay 6FP.

Because of the right-hand position of the contacts of the traffic direction relay 5–6FR, the code following track repeater relay 5–6TP is active to repeat the pulsing of the track relay 6TR. Thus, the relay 5–6TP is energized each time the relay 6TR is picked up by a circuit extending from (+) including front contact 32 of relay 6TR, front contact 33 of relay 6FBP, polar contact 34 of relay 5–6FR in its right-hand position, and winding of relay 5–6TP to (—).

The pulsing of contacts 35 and 36 of the relay 5–6TP provides for the energization of the relay 5–6H with direction current pulses to maintain that relay steadily picked up, the contact being effective to energize the primary winding of the decoding transformer 37 first in one direction and then the other, and the contact 36 being effective to rectify the output of the decoding transformer 37 to provide for the direct current energization of the relay 5–6H. It will be noted that the back contact 38 of relay 5–6FC is included in the control circuit of the relay 5–6H, such contact being included for purposes involving the organization of the system for reversal in the direction of traffic as will be hereinafter described.

The relay 5–6D is controlled by the decoding transformer 37, but such relay is dropped away under the conditions which are being considered because of the 75 code rate. Thus, the signal 6 displays a caution indication by the energization of its yellow lamp Y. The circuit for the yellow lamp Y extends from (+) including contact 39 of relay 5–6FR in its right-hand position, front contact 40 of relay 5–6H, back contact 41 of relay 5–6D, and the yellow lamp Y of signal 6 to (—).

It is selected by the closure of front contact 42 of relay 5–6H that the relay 5CP is active for the transmission of a 180 driven code in the track section 4–5T. The circuit by which relay 5CP is active extends from (+) including back contact 43 of relay 5TR, front contact 44 of relay 5–6FS, oscillator contact 180C, front contact 42 of relay 5–6H, front contact 45 of relay 6FBP, front contact 46 of relay 6FP, polar contact 47 of relay 5–6FR in its right-hand position, and winding of relay 5CP, to (—). The pulsing of contact 48 of relay 5CP alternately connects the track battery 49 and the track relay 5TR across the track rails at the right-hand end of the track section 4–5T.

The reception at the left-hand end of the track section 4–5T of the 180 code causes the pulsing of the track relay 4TR (see Fig. 2B) because of such relay being connected across the track rails through the back contact 50 of relay 4CP. The pulsing of contact 51 of relay 4TR causes the relays 4FP and 4FBP to be maintained steadily picked up, and the pulsing of contact 52 provides for the energization of the relay 3–4TP for each pulse of the code received, the circuit for relay 3–4TP including front contact 53 of relay 4FBP and polar contact 54 of relay 3–4FR in its right-hand position. In accordance with the pulsing of contacts 55 and 56 of the relay 3–4TP, at a 180 rate, relay 3–4H is maintained steadily picked up through the decoding transformer, and the relay 3–4D is energized by the output of the transformer 57 through its tuned circuit and rectifier 180DU to be maintained steadily picked up.

It is, therefore, provided that the signal 4 has its green lamp energized for providing a clear indication, the circuit for such lamp extending from (+) including polar contact 58 of relay 3–4FR in its right-hand position, front contact 59 of relay 3–4H, front contact 60 of relay 3–4D, and the green lamp G of signal 4, to (—).

The relay 3CP is active for the transmission of a 180 code at the right-hand end of the track section 2–3T, as selected by front contact 61 of the relay 3–4H. Thus the relay 3CP is energized for each pulse of the oscillator 180C by a circuit extending from (+) including back contact 62 of relay 3TR, front contact 63 of relay 3–4FS, oscillator contact 180C, front contact 61 of relay 3–4H, front contact 64 of relay 4FBP, front contact 65 of relay 4FP, polar contact 66 of relay 3–4FR in its right-hand position, and winding of relay 3CP, to (—).

The reception at the left-hand end of the track section 2–3T of the 180 code causes the pulsing of the relay 2TR (see Fig. 2A) because its winding is connected across the track rails through the back contact 67 of relay 2CP, and the pulsing of contact 68 of relay 2TR provides for the energization of the relays 2FP and 2FBP. The pulsing of contact 69 of relay 2TR causes the pulsing of the track repeater 2TP, such relay being energized for each pulse by a circuit extending from (+) including front contact 69 of relay 2TR, front contact 70 of relay 2FBP, polar contact 71 of relay 2FR in its right-hand position, and winding of relay 2TP, to (—).

The pulsing of contacts 72 and 73 of relay 2TP maintains the relays 2H and 2D picked up, the energization of such relays being effective only when polar contact 71 of relay 2FR is in its right-hand position. Although the relays 2H and 2D are picked up, the signals 2A and 2B are maintained at stop until a control is transmitted from the control office to cause the picking up of the relay 2RGZ.

The relay 4CP (see Fig. 2B) is active to transmit an inverse code from left to right in the track section 4–5T because of its energization for each pulse of the inverse code by a circuit extending from (+) including back contact 52 of relay 4TR, front contact 74 of relay 3–4FS, front contact 75 of relay 4FBP, polar contact 76 of relay 3–4FR in its right-hand position, back contact 77 of relay 3–4TPA, polar contact 78 of relay 3–4FR in its right-hand position, and winding of relay 4CP, to (—).

At the same time that the above described circuit for the relay 4CP is closed, a circuit is closed for the relay 3–4TPA extending from (+), including back contact 52 of relay 4TR, front contact 74 of relay 3–4FS, front contact 75 of relay 4FBP, contact 76 of relay 3–4FR in its right-hand position, the variable inductance 79 and the winding of relay 3-4TPA, to (—). Upon the picking up of the relay 3-4TPA, the circuit which has been described for the relay 4CP is open to terminate the inverse code pulse. It will be apparent from the circuits which have been described that the inclusion of the variable inductance in series with the winding of the relay 3-4TPA provides a means for adjusting the length of the inverse code pulse.

The reception of the inverse code at the right-hand end of the track section 4-5T causes the track relay 5TR (see Fig. 2C) to follow the code, and the pulsing of contact 81 of that relay provides for maintaining the relays 5FP and 5FBP picked up. It will be noted that the pulsing of contact 43 of the relay 5TR cannot affect the operation of the relay 5-6TP because of the contact 34 of the relay 5-6FR being in its right-hand position.

The relay 6CP is effective to transmit an inverse code from left to right in the track section 6-7T by the energization of a circuit similar to that described for the control of the relay 4CP except that the relay 6CP is rendered active only so long as the front contact 82 of the relay 5FP is closed, thus providing a means for providing tumble-down when the inverse code is removed at the left-hand end of the track section 4-5T. The circuit for relay 6CP extends from (+) including back contact 32 of relay 6TR, front contact 83 of relay 5-6FS, front contact 82 of relay 5FP, front contact 84 of relay 6FBP, contact 85 of relay 5-6FR in its right-hand position, back contact 86 of relay 5-6TPA, contact 87 of relay 5-6FR in its right-hand position, and winding of relay 6CP to (—).

The reception at the right-hand end of the track section 6-7T of the inverse code causes the pulsing of the track relay 7TR (see Fig. 2D) and the pulsing of contact 88 of such relay maintains the relays 7FP and 7FBP picked up.

The approach control relay 8AAR is maintained energized in accordance with the reception of the inverse code by the energization of a circuit extending from (+) including the contact 89 of relay 7FR in its right-hand position, front contact 90 of relay 7FP, and winding of relay 8AAR, to (—). The closure of front contact 91 of the relay 8AAR is effective through the CTC communication system to position the magnetic-stick relay 7AK (see Fig. 1) at the control office so as to provide that the indicator lamp 7AE controlled by such relay is maintained normally dark.

A front contact of the relay 8AAR in multiple with a front contact of the relay 8BAR is assumed to be included as a release circuit for the approach locking (not shown), such approach locking being provided in accordance with the usual practice, such, for example, as in a manner shown in my prior Patent No. 2,357,519, dated September 5, 1944. More specifically, an approach control relay could be provided for the signal 8 corresponding to the relay 8AS shown in Fig. 3 of my prior patent, and the front contacts of relays 8AAR and 8BAR connected in multiple could be used as an approach release in place of the front contact of the relay 8AR as shown in that patent.

At the left-hand end of the stretch of track between the passing sidings A and B, the relay 2BAR is normally energized in accordance with the reception of the driven code at the left-hand end of track section 2-3T. Relay 2BAR is energized by an obvious circuit in accordance with the closure of front contact 92 of relay 2H, and the energization of that relay is effective to close a release circuit (not shown) for the approach locking of signal 1A in a manner comparable to that which has been described with respect to the release circuit for signal 8A. In accordance with the closure of front contact 93 of relay 2BAR, it is provided that the approach indication relay 2AK (see Fig. 1) at the control office is energized with a polarity to provide that the approach indicator lamp 2AE is normally dark.

A traffic direction stick relay FS is normally energized at each of the intermediate signal locations by the closure of its stick circuit. Thus, the relay 3-4FS (see Fig. 2B) is maintained picked up by a stick circuit extending from (+) including back contact 94 of relay 3-4FC, front contact 95 of relay 3-4FS, and winding of relay 3-4FS to (—). The relay 5-6FS (see Fig. 2C) is maintained picked up by the energization of a similar circuit closed at back contact 96 of relay 5-6FC. It will be apparent as the description progresses that the relay 3-4FS is maintained picked up until there is a change in traffic direction, and the dropping away of that relay upon a change in traffic direction provides that driven code transmission cannot be rendered effective at that signal location until the reception of track circuit code for the new direction of traffic has been effective to pick up the relay H at that signal location.

*Passage of a train.*—To consider the mode of operation of the system upon passage of a train, it will be assumed that the conditions of the system are initially as illustrated in Fig. 3A, and as described when considering the normal conditions of the system with traffic established for the passage of east bound trains. It will be assumed that an east bound train approaches the signal 2A at the left-hand end of the stretch of single track and that an operator at the control office actuates the signal control lever 1-2SGL to its right-hand position for causing the clearing of that signal. With reference to Fig. 1, the operation of the lever 1-2SGL to its right-hand position closes contacts 97 and 98 of that lever for the respective signal control channels of the code communication system to provide for the transmission of a signal control code to field station No. 2 for the picking up of the relay 2RGZ (see Fig. 2A).

In accordance with the picking up of relay 2RGZ, a circuit is closed for the signal control relay 2AG extending from (+) including front contact 99 of relay 1-2TR, front contact 100 of relay 2NCR, back contact 101 of relay 2RCR, polar contact 102 of relay 2FR in its right-hand position, front contact 103 of relay 2RGZ, front contact 104 of relay 2H, and winding of relay 2AG, to (—). Upon the picking up of relay 2AG, the circuit for the red lamp R of signal 2A is opened at back contact 105, and the closure of front contact 105 of relay 2AG provides an obvious circuit for the energization of the green lamp G of signal 2, including front contact 106 of the relay 2D (assuming that such relay to be picked up in response to a 180 driven code in the track section 2-3T).

When the east bound train accepts the signal 2A and enters the OS track section 1-2T, the relay 2RGZ is dropped away by the opening of its stick circuit (not shown) in a manner fully disclosed in the above-mentioned patent to Hailes et al. The dropping away of the OS track relay 1-2TR causes the dropping away of the relay 2AG to open the circuit for the green lamp G of signal 2A and closes a circuit for the red lamp R of that signal. The dropping away of relay 1-2TR also closes back contact 107 for the transmission of an indication by the code communication system to the control office that the track section 1-2T has become occupied by the train.

The shunting of the track section 2-3T as the train progresses causes the dropping away of the relays 2FP, 2FBP, 2H and 2D, when the track relay 2TR is rendered inactive, and the dropping away of relay 2H opens the circuit for the relay 2BAR to cause that relay to be dropped away. Upon the dropping away of the relay 2BAR under such conditions, with the relay 2AAR dropped away at that time, provides that an indication is transmitted by the code communication system to the control office that the train has entered the track section 2-3T. Such indication is communicated to the control office because of the front contacts 93 and 103 of relays 2AAR and 2BAR being open.

Assuming further progress of the train, the entrance of the train into the track section 4-5T causes the dropping away of relays 4FP, 4FBP, 3-4H and 3-4D because of the track relay 4TR being rendered inactive, and the dropping away of relay 3-4H opens the circuit for the green lamp of signal 4 and closes an obvious circuit at back contact 59 for the red lamp R of that signal. In accordance with the dropping away of relay 3-4H, the shifting of contact 61 of that relay changes the code transmitted by the relay 3CP from a 180 code to a 75 code by the inclusion of the oscillator contact 75C in the circuit for relay 3CP in place of the oscillator contact 180C.

The presence of the train in the track section 4-5T causes the removal of inverse code from the track section 4-5T in an obvious manner, and thus the relays 5FP and 5FBP at the right-hand end of track section 4-5T are dropped away. The dropping away of relay 5FP renders the relay 6CP inactive for the transmission of an inverse code in the track section 6-7T by opening the circuit for that relay at front contact 82. Thus, the relays 7FP and 7FBP are dropped away at the right-hand end of the track section 6-7T, and the dropping away of relay 8AAR upon the opening of front contact 90 of relay 7FP is effective to render the approach control effective for the signal 8A in a manner which has been described. Because of the front contacts 91 and 109 of relays 8BAR and 8AAR being open at the same time, an indication is transmitted to the control office that the east bound train is in approach of the signals 8A and 8B.

When the track section 2-3T becomes unoccupied in the rear of the train, the transmission of a 75 driven code from right to left in that track section causes the relay 2H to be again picked up, and the picking up of such relay causes the picking up of relay 2BAR upon the closure of front contact 92. The closure of front contact 93 of relay 2BAR causes the transmission of an indication to the control office that the track section 2-3T has become unoccupied in the rear of the train.

Considering further passage of the train, a similar mode of operation is effective upon the entrance of the train into the track section 6-7T as has been described upon considering entrance of the train into the track section 4-5T, the shifting of contact 42 upon the dropping away of the relay 5-6H being effective to select a 75 code for transmission through the track section 4-5T to provide for the picking up of relay 3-4H when the track section 4-5T becomes unoccupied in the rear of the train, and thus, cause the energization of the yellow lamp Y of signal 4.

Assuming the dispatcher to have operated the signal control lever 7-8SGL to its right-hand position, the signal 8A or the signal 8B, dependent upon the position designated for the operation of the track switch 3W, is cleared for governing further passage of the east bound train, and it is believed to be readily apparent from the description as it has been set forth how such signal is controlled in accordance with the picking up of the relay 3RGZ in response to a control code transmitted from the control office. The picking up of the relay 3RGZ, when the track switch 3W is in its normal position, closes a circuit for the relay 8AG (assuming the relay 8H for the track section 8-9T to be picked up) extending from (+) including front contact 110 of relay 7-8TR, front contact 111 of relay 3NCR, back contact 112 of relay 3RCR, front contact 113 of relay 3RGZ, front contact 114 of relay 8H, and winding of relay 8AG, to (−). The picking up of relay 8AG selects the energization of the lamps of signal 8A in an obvious manner by contact 115. If the track switch 3W is in its reverse position, the relay 8BG is picked up by a circuit extending from (+) including front contact 110 of relay 7-8TR, back contact 111 of relay 3NCR, front contact 116 of relay 3RCR, front contact 117 of relay 3RGZ, and winding of relay 8BG, to (−).

It will be noted that the shifting of contact 118 of relay 8AG upon the picking up of that relay for the control of signal 8A changes the code rate transmitted from right to left in the track section 6-7T from a 75 code to a 180 code, but in order that the relay 7CP may be active for the transmission of a 180 driven code, the approach control relays 8AAR and 8BAR must both be dropped away. This arrangement provides a check on the inverse code to provide that the signal 6 cannot provide a clear indication, even though the signal 8A is clear, if an inverse code is received at the right-hand end of the track section 6-7T so as to hold the approach control relay 8AAR in its picked up position. Thus, there is a check provided that prevents the signal 8A from providing a more favorable indication than caution if the relay 8AAR is held up by foreign current in the track section 6-7T when the inverse code is intended to be removed from that track section by the presence of an approaching train in the track section 4-5T. The principles of operation of this arrangement of a check on the inverse codes is more fully disclosed in the patent to F. X. Rees, Patent No. 2,353,930 dated July 18, 1944, to which reference can be made for a more complete disclosure. It is, therefore, provided that the relay 7CP can become active for the transmission of a 180 driven code only when relays 8AAR and 8BAR are both dropped away. The circuit for relay 7CP under such conditions extends from (+) including back contact 22 of relay 7TR, oscillator contact 180C, front contact 118 of relay 8AG, back contact 119 of relay 8BAR, back contact 120 of relay 8AAR, back contact 23 of relay 7FBP, back contact 24 of relay 7FZ, contact 25 of relay 7FR in its right-hand position, front contact 26 of relay 7AS, and winding of relay 7CP, to (−).

*Change in direction of traffic.*—To consider the mode of operation of the system when it is desired to change the direction of traffic, it will be assumed that traffic direction is established as illustrated in the drawings and as heretofore described for east bound traffic and that the conditions of the system exist as they have been described when considering the normal conditions of the system, and as illustrated in the track diagram of Fig. 3A.

To initiate the change in traffic direction, the dispatcher rotates the traffic direction button 1–8FB in a counterclockwise direction and then depresses the button to initiate the transmission of a cycle of operation of the communication system to the field for initiating the change in the direction of traffic.

When the button 1–8FB is rotated in a counter-clockwise direction the rotary contact of that button in combination with the depression of the button closes a circuit for the upper winding of the relay 1–8FL to cause that relay to operate its polar contacts to their left-hand positions. The upper winding of relay 1–8FL is energized under such conditions by a circuit extending from (+) including back contact 121 of relay 1–2GK, upper winding of relay 1–8FL, contact 122 of the button 1–8FB closed in its counter-clockwise rotated position, contact 123 of button 1–8FB closed when that button is depressed, and back contact 124 of relay 7–8GK to (−). It will be noted that the energization of the circuit just described can be effected only when the relays 1–2GK and 7–8GK are operated to their dropped away positions in correspondence with the stop indication of the signals governing entrance to the stretch of track between the passing sidings A and B. In other words, the relay 1–8FL operates its contacts in response to the operation of the button 1–8FB, only if the signals governing entrance to the stretch of track between the passing sidings A and B are at stop.

The change relay CH2 is picked up in response to the depression of the button 1–8FB by the energization of a circuit extending from (+) including contact 125 of button 1–8FB in its depressed position, contact 126 of button 1–8FB in its counter-clockwise rotated position, windings of relay CH2, and normally closed contact 127 of the cancel button CAN, to (−). Relay CH2 is maintained picked up by its stick circuit which is closed at back contact 128 of relay LC2 until relay LC2 is picked for the transmission of a control cycle to field station No. 2.

The picking up of relay CH2 is effective to initiate the transmission of a control cycle of operation of the code communication system for the transmission of controls to field station No. 2 by the shifting of contact 129 to cause the picking up of relay LC2 in a manner specifically disclosed for the operation of the relay LC2 shown in Fig. 2A of the above-mentioned Hailes et al. application. The picking up of relay LC2, as disclosed in that application, connects respective channels of the code communication system through switch and signal selecting contacts to the code determining relays SL and LS. An additional channel wire No. 130 is used according to the present invention for providing a code character in the control cycle of operation for the control of a magnetic-stick relay FZ in the field. It is to be understood that the character used for the control of the relay FZ in the field may be suitably positioned in the control cycle in accordance with the requirements of practice to either precede or follow the characters used for switch and signal control, and such character can be decoded at a field station in any suitable manner according to the requirements of practice, such for example, as in the manner specifically disclosed in Fig. 5 of my prior application, Ser. No. 655,622, dated March 19, 1946. Such figure shows specifically decoding means for positioning the contacts of a magnetic-stick traffic direction relay in response to the reception at a field station of respective (LS) and (SL) code characters. Thus, for the purpose of simplification of the disclosure of the present invention, it is believed sufficient to assume that the transmission from the control office of an (LS) character is effective to pick up the relay FZ by the polarity of energization of its upper winding at the field station selected for the reception of controls, and the transmission of an (SL) character is effective to cause the dropping away of the relay FZ by the polarity of energization of the lower winding of that relay at the field station selected for reception of controls to cause that relay to be dropped away.

It is selected when considering a change in the direction of traffic, that the code character transmitted to the field station No. 2 in the control cycle which has been described as being initiated by the picking up of relays CH2 and LC2, is an (LS) character to cause the energization of the upper winding of the relay 2FZ at field station No. 2 to pick up that relay. More specifically, when energy is applied to the channel wire No. 130 during the transmission of the control cycle, the relay LS is picked up by the energization of a circuit extending from the channel wire No. 130 including front contact 131 of relay LC2, contact 132 of relay 1–8FL in its left-hand position, back contact 133 of relay 3FPS, and winding of relay LS to (−). The picking up of relay LS by the closure of front contact 134 selects an (LS) code character for transmission during the control cycle to the field station No. 2 for the control of relay 2FZ at that field station.

Upon the reception of the control cycle at field station No. 2, the LS character for the control of relay 2FZ (see Fig. 2A) causes energy to be applied to the upper winding of that relay through a circuit including contact 135 of relay 2FR in its right-hand position. This arrangement provides that the relay 2FZ cannot be picked up to interfere with code transmission when the code transmitter relay 2CP is active for the transmission of a driven code.

The picking up of relay 2FZ in response to the control cycle of operation transmitted from the control office, closes a circuit to energize the lower winding of the traffic direction relay 2FR to operate the contacts of such relay to their left-hand positions. Such circuit extends from (+) including front contact 136 of relay 2FZ, front contact 137 of relay 2AS, and lower winding of relay 2FR to (−). It will be noted that the inclusion of front contact 137 of relay 2AS in that circuit checks that the signals 2A and 2B are at stop and that the approach locking associated with such signals assumes its normal position.

In response to the shifting of the contacts of relay 2FR to their left-hand positions, the opening of a circuit by contact 138 of relay 2FR is effective to transmit an indication to the control office of the change in the position of the contacts of that traffic direction relay, and the reception of such indication at the control office is effective to operate the contacts of the magnetic-stick relay 2FK to their left-hand positions. Upon the operation of the contacts of relay 2FK to their left-hand positions, the stick circuit by which relay 2FPS has been maintained picked up is opened at contact 21, and thus, the relay 2FPS is dropped away. It will be more apparent as the description progresses that the dropping away of the relay 2FPS conditions a circuit at back contact 139 whereby the relay LS can be energized for the transmission of an (LS) character at some future time when it is desirable to again change the direction of traffic. It will be noted that the dropping away of relay 2FPS is not effective by the closure of back contact 140 to pick up the relay CH3 for the initiation of a control cycle for transmission to field station No. 3 because of the contact 141 of relay 2FK being in its left-hand position. Thus, the relay 2FPS, and also the relay 3FPS, is effective to automatically initiate the transmission of a control cycle only just prior to the picking up of that relay in a manner to be hereinafter described.

Upon the shifting of the contact 142 of the relay 2FR (see Fig. 2A), with the relay 2FZ picked up, the relay 2CP becomes steadily energized to connect the track battery across the track rails of the track section 2-3T through front contact 67 of relay 2CP. The circuit by which relay 2CP is steadily energized under such conditions extends from (+) including back contact 69 of relay 2TR, front contact 143 of relay 2FZ, contact 142 of relay 2FR in its left-hand position, front contact 144 of relay 2AS, and winding of relay 2CP, to (−).

As a result of the steady energization of the track rails of the track section 2-3T, the track relay 3TR (see Fig. 2B) at the right-hand end of the track section becomes steadily energized, and the relay 3FP is picked up, but the relay 3FBP remains in its dropped away position.

The picking up of the relay 3FP, with the relay 3FBP dropped away, closes a circuit for the traffic change relay 3-4FC extending from (+) including back contact 145 of relay 3FBP, front contact 146 of relay 3FP, contact 147 of relay 3-4FR in its right-hand position, and winding of relay 3-4FC to (−). The relay 3-4FC has slow pickup characteristics so as to insure that the particular combination of the picking up of the relay 3FP with the dropped away relay 3FBP is in response to the steady energization of the track rails rather than to a condition involving the establishment of track circuit code in that track section as after the passage of a train.

In response to the picking up of relay 3-4FC, the circuit for relay 3-4H is opened at back contact 148 to cause that relay to be dropped away, and also the stick circuit by which the relay 3-4FS has been maintained picked up is opened at back contact 94 to cause that relay to be dropped away after its picked up circuit is opened at front contact 149 of relay 3-4H.

With the relays 3-4H and 3-4FS dropped away, a circuit is closed by which the upper winding of relay 3-4FR is energized with a polarity to operate the contacts of that relay to their left-hand positions. Such circuit extends from (+) including back contact 149 of relay 3-4H, back contact 150 of relay 3-4FS, front contact 151 of relay 3FP, back contact 152 of relay 3FBP, front contact 153 of relay 3-4FC, and upper winding of relay 3-4FR, to (−). The shifting of contact 147 of relay 3-4FR opens the circuit by which relay 3-4FC has been energized, and causes the dropping away of that relay. Relay 3-4FR is maintained with its contacts in their left-hand positions by its magnetic-stick characteristics.

Although the relay 3CP has been rendered inactive upon the reception of the steady energization at the right-hand end of the track section 2-3T by the opening of its circuit at back contact 62 of relay 3TR, the shifting of contact 66 of the relay 3-4FR in the circuit for relay 3CP prevents further transmission of driven codes by that relay and conditions that relay so that it can be used for the transmission of an inverse code for approach control purposes.

Upon the shifting of contact 78 of the relay 3-4FR to its left-hand position in the circuit for relay 4CP, a circuit is closed to pick up relay 4CP for the steady energization of the track rails at the left-hand end of the track section 4-5T. The circuit by which relay 4CP is steadily energized under such conditions extends from (+) including back contact 52 of relay 4TR, back contact 154 of relay 3FBP, front contact 155 of relay 3FP, contact 78 of relay 3-4FR in its left-hand position, and winding of relay 4CP, to (−). The closure of front contact 50 upon the picking up of relay 4CP applies steady energy from the track battery 156 to the track rails at the left-hand end of the track section 4-5T.

At the right-hand end of the track section 4-5T, the reception of the steady energy, as compared to the inverse code which has been received at that end of the track section, causes the dropping away of the relay 5FBP (see Fig. 2C) because of the steady energizing of the track relay 5TR, and thus closes a circuit for the slow pickup relay 5-6FC. Such circuit extends from (+) including back contact 157 of relay 5FBP, front contact 158 of relay 5FP, contact 159 of relay 5-6FR in its right-hand position, and winding of relay 5-6FC, to (−).

The picking up of relay 5-6FC causes the dropping away of relay 5-6H by opening its circuit at back contact 38, and the relay 5-6FS is dropped away upon the dropping away of relay 5-6H because of the opening of its stick circuit upon the picking up of relay 5-6FC and its pickup circuit at front contact 160 of relay 5-6H.

Upon the dropping away of the relay 5-6FS, a circuit is closed for energizing the upper winding of the relay 5-6FR with a polarity to operate the contacts of that relay to their left-hand positions. The circuit by which the upper winding of relay 5-6FR is energized extends from (+) including back contact 160 of relay 5-6H, back contact 161 of relay 5-6FS, front contact 162 of relay 5FP, back contact 163 of relay 5FBP, front contact 164 of relay 5-6FC, and upper winding of relay 5-6FR, to (−). The shifting of relay 5-6FR causes the dropping away of relay 5-6FC, and the dropping away of that relay opens the circuits for both windings of relay 5-6FR at front contact 164 and 165.

Although the code transmitter relay 5CP has been rendered inactive for the transmission of driven codes from right to left in the track section 4-5T by the steady energization of relay 5TR and the opening of its circuit at back contact 43, the shifting of contact 47 of relay 5-6FR to its left-hand position conditions the relay 5CP for the transmission of an inverse code for use in approach control when the driven code transmitter is rendered active at the left-hand end of the track section 4-5T.

The relay 6CP is steadily energized to apply steady energy to the track rails at the left-hand end of track section 6-7T through front contact 29 in accordance with the energization of a circuit closed upon the shifting of the contacts of relay 5–6FR. The circuit by which relay 6CP is energized under such conditions extends from (+) including back contact 32 of relay 6TR, back contact 166 of relay 5FBP, front contact 167 of relay 5FP, contact 87 of relay 5–6FR in its left-hand position, and winding of relay 6CP, to (—).

The reception of the steady energy at the right-hand end of the track section 6–7T maintains the track relay 7TR (see Fig. 2D) steadily picked up, and thus causes the dropping away of the relay 7FBP. The dropping away of relay 7FBP closes a circuit for the slow pickup relay 7FC extending from (+) including front contact 168 of relay 7FP, back contact 169 of relay 7FBP, contact 170 of relay 7FR in its right-hand position, and winding of relay 7FC, to (—). In response to the picking up of relay 7FC, the upper winding of the relay 7FR is energized with a polarity to operate its contacts to their left-hand positions. The circuit by which relay 7FR is energized extends from (+) including front contact 168 of relay 7FP, back contact 169 of relay 7FBP, front contact 171 of relay 7FC, and upper winding of relay 7FR, to (—). The shifting of contact 170 of relay 7FR causes the dropping away of relay 7FC, and the dropping away of that relay opens the circuit for the upper winding of relay 7FR at front contact 171.

Upon the shifting of the contacts of relay 7FR to their left-hand positions, the circuit by which the relay 7CP has been active for the transmission of driven codes is opened at contact 25, but such relay has been rendered inactive by the opening of its circuit at back contact 22 upon the steady energization of the track relay 7TR.

Having thus checked that the stretch of track is unoccupied by a train with a condition of steady energization applied to the entrance end of each of the track sections in the stretch, the operation of the contacts of the relay 7FR to their left-hand positions is an indication that the stretch of track is unoccupied, and such indication is communicated to the control office by the code communication system in accordance with the closure of contact 172 of relay 7FR in its left-hand position. The indication transmitted in accordance with the closure of contact 172 of relay 7FR in its left-hand position is effective at the control office to operate the contacts of the magnetic-stick relay 3FK (see Fig. 1) to their left-hand positions.

Upon the operation of the contact 173 of relay 3FK to its left-hand position in response to the reception of an indication that the stretch of track is unoccupied by a train, a circuit is closed to energize the relay CH2 for initiating the transmission of a control cycle to field station No. 2. The circuit by which relay CH2 is energized under such conditions extends from (+) including back contact 174 of relay 3FPS, contact 173 of relay 3FK in its left-hand position, winding of relay CH2, and normally closed contact 127 of the cancel button CAN, to (—). The picking up of relay CH2 causes the picking up of relay LC2 at the beginning of a control cycle for the transmission of controls to field station No. 2. When the relay LC2 has been picked up, subsequent to the shifting of contact 175 of relay 3FK to its left-hand position, the relay 3FPS is picked up by the energization of a circuit extending from (+) including front contact 176 of relay LC2, contact 175 of relay 3FK in its left-hand position, and winding of relay 3FPS, to (—). A stick circuit is closed for relay 3FPS at front contact 177 including contact 175 of relay 3FK in its left-hand position to maintain that relay picked up until another change in the direction of traffic is effected. The picking up of relay 3FPS opens the pickup circuit that has been described for relay CH2 at back contact 174 to cause the dropping away of that relay.

As has been pointed out when considering the general mode of operation of the system, the purpose of automatically initiating the communication system into a cycle of operation for the transmission of controls to field station No. 2 is to remove the condition of steady energization of the track rails that has been applied to the left-hand end of the stretch of track between the two passing sidings, and initiate the transmission of driven code at such end in the direction required for the control of signals governing west bound traffic. It is the purpose of the control cycle described as having been initiated, to transmit a control to field station No. 2 for the energization of the lower winding of the relay 2FZ (see Fig. 2A) with a polarity to cause such relay to be dropped away. Thus, having described the relay 2FZ as having been picked up initially by the transmission of an (LS) character, an (SL) character is transmitted for the dropping away of the relay 2FZ during the cycle of operation under present consideration.

The relay SL is picked up during the control cycle in response to the application of energy to the channel wire No. 130 for effecting the transmission of an (SL) character by the energization of a circuit extending from the channel wire No. 130 including front contact 131 of relay LC2, contact 132 of relay 1–8FL in its left-hand position, front contact 133 of relay 3FPS, and winding of relay SL, to (—). The application of energy at field station No. 2, upon reception of the above-described traffic control, to the wire 178 by the decoding circuits of the communication system, causes energization of the lower winding of relay 2FZ with a polarity to cause that relay to be dropped away.

Upon the dropping away of relay 2FZ, the circuit by which the relay 2CP has been steadily energized is opened at front contact 143, and the closure of back contact 143 renders the relay 2CP active for the transmission of a driven code in accordance with the contact 142 of relay 2FR being operated to its left-hand position. Thus, the relay 2CP becomes active to transmit a 75 driven code (assuming the signal 1A to be at stop) by the energization for each pulse of the code of a circuit extending from (+) including back contact 69 of relay 2TR, oscillator contact 75C, front contact 179 of relay 2AAR, back contact 180 of relay 2FBP, back contact 143 of relay 2FZ, contact 142 of relay 2FR in its left-hand position, front contact 144 of relay 2AS, and winding of relay 2CP, to (—).

The pulsing of contact 67 of relay 2CP applies code pulses at a 75 rate to the track rails of the track section 2–3T, and the reception of such pulses at the right-hand end of that track section causes the relay 3TR (see Fig. 2B) to follow the code. The relay 3FP is maintained picked up, and the relay 3FBP is picked up in accordance with the pulsing of the contact 181 of relay 3TR.

Inasmuch as the relay 3–4FR has had its contacts operated to their left-hand positions, the relay 3–4TP is selected to follow the coding of contact 62 of relay 3TR, such relay being rendered active in accordance with the closure of front contact 182 of relay 3FBP. The pulsing of contacts 55 and 56 of relay 3–4TP provides for the picking up of the relay 3–4H in a manner which has been described, and the yellow lamp of signal 3 becomes energized in accordance with the picking up of relay 3–4H by a circuit extending from (+) including contact 58 of relay 3–4FR in its left-hand position, front contact 183 of relay 3–4H, back contact 184 of relay 3–4D, and the yellow lamp Y of signal 3, to (—). It will be noted that the signal 3 is selected in preference to signal 4 by the shifting of contact 58 of the traffic direction relay 3–4FR upon changing the direction of traffic, thus, the lamps of signal 4 are all deenergized when the direction of traffic is established for west bound trains.

The relay 3–4FS has its pickup circuit energized upon the picking up of relay 3–4H by the closure of front contact 149, and the picking up of that relay establishes its stick circuit which is maintained closed dependent upon back contact 94 of the relay 3–4FC. It will be noted that the relay 3–4RS must be picked up before the relay 4CP can be rendered active for the transmission of a driven code in the track section 4–5T because the front contact 94 of relay 3–4FS is included in the circuit for rendering the relay 4CP active as a driven code transmitter. It is, therefore, provided by this circuit organization that the rendering active of the relay 4CP initially, subsequent to a change in traffic direction, is dependent upon the reception of a track circuit code at the right-hand end of the track section 2–3T.

This organization of the system provides that even though the traffic direction relay 3–4FR at the intermediate signal location can be operated to change direction of traffic by the application of steady energy to the track rails of the track section 2–3T under abnormal conditions, as by a signal maintainer in testing circuits, the code transmitter relay 4CP cannot be rendered active unless a traffic direction control is transmitted from the control office in accordance with the newly selected direction of traffic for initiating the driven code transmitter at the left-hand end of the stretch of track to provide that the relay 3–4H is responsive to a track circuit code, and by its picking up, a pickup circuit is closed by which the relay 3–4FS can be picked up to render the code transmitter relay 4CP active. It is believed to be readily apparent that a similar mode of operation is effective at the intermediate location of signals 5 and 6, and for a change in traffic direction to set up the opposite direction of traffic to that which has been specifically considered.

Upon the picking up of relay 3–4FS in response to the reception of track circuit code at the right-hand end of track section 2–3T, the relay 4CP is rendered active for the transmission of a 180 code, the circuit which has been described by which the relay 4CP has been steadily energized having been opened at back contact 154 of relay 3FBP upon the picking up of that relay. The circuit by which the relay 4CP is energized for each pulse of the 180 code extends from (+) including back contact 52 of relay 4TR, front contact 74 of relay 3–4FS, oscillator contact 180C, front contact 185 of relay 3–4H, front contact 154 of relay 3FBP, front contact 155 of relay 3FP, contact 78 of relay 3–4FR in its left-hand position, and winding of relay 4CP, to (—).

The pulsing of contact 50 of relay 4CP applies code pulses to the track rails of the track section 4–5T at a 180 rate, and the reception of such pulses at the right-hand end of that track section renders the relay 5TR (see Fig. 2C) active to follow the code. The pulsing of contact 81 of relay 5TR provides for the picking up of the relay 5FBP. Upon the picking up of relay 5FBP, the track repeater relay 5–6TR is rendered active to repeat the code pulses by the energization of a circuit extending from (+) for each pulse including front contact 43 of relay 5TR, front contact 186 of relay 5FBP, contact 34 of relay 5–6FR in its left-hand position, and winding of relay 5–6TP, to (—). The pulsing of the contacts 35 and 36 of relay 5–6TP is effective to cause the picking up of relay 5–6H and 5–6D, and the picking up of such relays provides for the energization of the green lamp of signal 5 by a circuit extending from (+) including contact 39 of relay 5–6FR in its left-hand position, front contact 187 of relay 5–6H, front contact 188 of relay 5–6D, and the green lamp G of signal 5, to (—).

The relay 5–6FS is picked up in response to the picking up of the relay 5–6H when code is received at the right-hand end of the track section 4–5T by the energization of an obvious circuit closed at front contact 160, and the picking up of that relay establishes its stick circuit which is maintained closed at back contact 96 of relay 5–6FC until the relay 5–6FC is again picked up upon another change in the direction of traffic.

The circuit by which the relay 6CP has been steadily energized is opened upon the picking up of relay 5FBP, and the relay 6CP becomes active to transmit a 180 driven code in accordance with the relay 5–6H being picked up in response to the reception of a track circuit code through the track section 4–5T. The circuit by which the relay 6CP is rendered active for the transmission of a driven code is closed upon the picking up of relay 5–6FS and extends from (+) including back contact 32 of relay 6TR, front contact 83 of relay 5–6FS, oscillator contact 180C, front contact 189 of relay 5–6H, front contact 166 of relay 5FBP, front contact 167 of relay 5FP, contact 87 of relay 5–6FR in its left-hand position, and winding of relay 6CP to (—).

The pulsing of contact 29 of relay 6CP applies driven code pulses to the track rails of track section 6–7T at a 180 rate, and the reception of such pulses at the right-hand end of that track section renders the track relay 7TR (see Fig. 2D) active to follow the code, and thus provides for the picking up of the relay 7FBP by the pulsing of contact 88.

The pulsing of contact 22 of relay 7TR causes the relay 7TP to become active by the energization of a circuit extending from (+) including front contact 22 of relay 7TR, front contact 190 of relay 7FBP, contact 191 of relay 7FR in its left-hand position, and winding of relay 7TP, to (—); and the pulsing of the contacts 192 and 193 of relay 7TP at a 180 rate, with the contacts of relay 7FR in their left-hand positions provides a means through the decoding transformer for picking up the relays 7H and 7D to provide for the clearing of signal 7A or signal 7B in response to the transmission of a signal control from the control office for clearing either of such signals. Thus, for example, if the dispatcher transmits a control cycle of operation to the field station No. 3 calling for the track switch 3W to be in its normal position and the signal 7A to be clear, the picking up of the relay 3LGZ in response to such cycle of operation closes a circuit for the energization of relay 7AG extending from (+) including front contact 110 of relay 7–8TR, front contact 111 of relay 3NCR, back contact 112 of relay 3RCR, contact 194 of relay 7FR in its left-hand position, front contact 195 of relay 3LGZ, front contact 196 of relay 7H, and winding of relay 7AG, to (—). The picking up of relay 7AG opens the circuit by which the red lamp R of that signal has been energized at back contact 197, and closes a circuit for the green lamp G of that signal extending from (+) including front contact 197 of relay 7AG, front contact 198 of relay 7D, and the green lamp G of signal 7A, to (—).

The establishment of inverse code transmission through the track sections 2–3T and 4–5T for approach control associated with the signal 1A is comparable to the manner which has been heretofore described in which the transmission of inverse code through the track sections 4–5T and 6–7T is effective for providing approach control for the signal 8A. Thus, the relay 5–6TPA (see Fig. 2C) is active for the transmission of an inverse code by the energization for each pulse of the inverse code of a circuit closed upon the dropping away of the relay 5TR and extending from (+) including back contact 43 of relay 5TR, front contact 44 of relay 5–6FS, front contact 199 of relay 5FBP, contact 85 of relay 5–6FR in its left-hand position, back contact 86 of relay 5–6TPA, contact 47 of relay 5–6FR in its left-hand position, and winding of relay 5CP, to (—). The relay 5–6TPA is energized at the same time, and the picking up of such relay after a time delay provided by the variable inductance 200 terminates the inverse code pulse upon the opening of back contact 86.

The reception of the inverse code at the left-hand end of the track section 4–5T when the system is established for west bound traffic provides for the relays 4FP and 4FBP to be picked up, and the picking up of relay 4FP is effective to render the relay 3CP active for the transmission of an inverse code in the track section 2–3T. The circuit by which the relay 3CP is active for inverse code transmission under such conditions extends from (+) including back contact 62 of relay 3TR, front contact 63 of relay 3–4FS, front contact 80 of relay 4FP, front contact 201 of relay 3FBP, contact 76 of relay 3–4FR in its left-hand position, back contact 77 of relay 3–4TPA, contact 66 of relay 3–4FR in its left-hand position, and winding of relay 3CP, to (—).

Having thus described in detail the mode of operation of the system upon a change in direction of traffic from a direction originally set up for east bound traffic to the direction set up for west bound traffic, inasmuch as the system is symmetrical in its operations for a change of traffic in either direction, it is believed to be readily apparent from the description as it has been set forth that a similar mode of operation is effective to change the direction of traffic from traffic set up for west bound traffic to a direction of traffic for the passage of east bound trains.

It will be noted that the above described specific mode of operation of the system bears out the general description as it has been set forth with respect to the mode of operation of the system upon reversal of traffic in that a single manual designation of traffic reversal at the control office is all that is required to cause the transmission of a control to the entrance end of the stretch, according to the last established direction of traffic, for the application of steady energy to the track rails such stretch of track is unoccupied by a train, and the reception of such indication at the control office being effective to initiate the transmission of a cycle of operation of the code communication system for transmitting a control to the entrance end of the stretch, according to the last established direction of traffic, for the removal of the condition of steady energization from the track rails, and the initiation of driven code transmission for the control of signals governing the direction of traffic which has been manually designated by the dispatcher at the control office.

It is believed to be apparent from the description as it has been set forth that if the condition of steady energization fails to be transmitted from one end of the stretch to the other because of the presence of a train at an intermediate point, there is no indication transmitted to the control office for operating the relay FPS (see Fig. 1) associated with the exit end of the stretch, according to the last established direction of traffic, and therefore, such relay upon remaining dropped away, selects an (LS) character for the transmission to the field station No. 2 for any cycle of operation for the transmission of controls that can be manually initiated by the dispatcher. Thus, it is provided that even though the dispatcher manually initiates the code communication system into a cycle of operation for the transmission of controls to field station No. 2, he cannot in any way designate a control for transmission that will remove the steady energization from the end of the stretch corresponding to the entrance end for the last direction of traffic, and establish the transmission of driven code for the newly designated direction. By this arrangement it is provided that a reversal in traffic direction as for the back-up movement of a train when a train occupies the stretch of track cannot be accomplished. This feature of the system is desirable under certain conditions to be encountered in practice as compared to a system allowing back-up train movements as in my prior Patent No. 2,357,519, dated September 5, 1944.

It has been pointed out that the approach control of the leaving signals at the ends of the stretch is dependent upon the combined operations of the relays AAR and BAR in such a manner that an indication is transmitted to the control office that the associated approach section is occupied by a train only if both relays are dropped away; and similarly, the dropping away of both of the relays is required to prevent the approach release of the locking for the leaving signal at the end of the stretch with which such relays are associated.

Generally speaking, the relay AAR at each end of the stretch is energized in response to the inverse code provided for approach control, while the relay BAR is energized at each end of the stretch when such end is an entrance point with respect to the stretch and an inverse code is not transmitted through the coded track circuit at that end. In such a case, the relay BAR is energized in response to the driven code transmitted through the track rails to that end of the stretch. Although each relay BAR is shown as being energized in response to either code rate, it is to be understood that it can be energized only in response to a 180 code if it is desired to extend occupancy detection for another track section.

It will be readily apparent that provision must be made for preventing the momentary deenergization contemporaneously of the relays AAR and BAR at each end of the stretch of track when the system is in the process of reversal in the direction of traffic. Thus, it is provided that by use of stick circuits for those relays, the relay AAR or BAR which has been energized in accordance with the last established direction of traffic is maintained picked up until the reversal in the direction of traffic has been effective to establish a pickup circuit for the relay AAR or BAR that has been deenergized according to the last established traffic direction.

Assuming a change in traffic direction to have been designated as has been heretofore described, the shifting of contact 202 of relay 2FR (see Fig. 2A) to its left-hand position in the process of change of direction conditions a pickup circuit for the relay 2AAR, including front contact 203 of relay 2FP. A stick circuit is closed upon the shifting of contact 204 of relay 2FR to its left-hand position to maintain the relay 2BAR picked up until the above described pickup circuit is closed for the relay 2AAR upon the transmission of codes through the track section 2–3T from right to left. Such stick circuit extends from (+) including contact 204 of relay 2FR in its left-hand position, back contact 205 of relay 2AAR, front contact 206 of relay 2BAR, and winding of relay 2BAR, to (—).

It will be noted that the relay 2AAR has its pickup circuit momentarily closed upon the shifting of contact 202 of relay 2FR to its left-hand position, but this circuit is opened very shortly when the relay 2CP becomes steadily energized to provide for the dropping away of relay 2FP. The relay 2AAR is preferably slow enough in picking up so that it is not picked up when momentarily energized under these conditions, and therefore, the stick circuit for the relay 2BAR is maintained closed at back contact 205 of relay 2AAR until a complete change in traffic direction has been effective to provide for the response of the relay 2AAR to an inverse code transmitted from right to left in the track section 2–3T. If, however, the relay 2AAR should be momentarily picked up when its pickup circuit is momentarily closed upon the shifting of contact of relay 2FR, the relay 2BAR is sufficiently slow in releasing to provide that the momentary opening of its stick circuit at back contact 205 of relay 2AAR cannot cause the dropping away of that relay.

By this arrangement is is provided that the relay 2BAR is maintained picked up until the inverse code is established in the track section 2–3T according to the newly designated direction of traffic, and thus energy is continuously applied to the wire 207 so as to maintain the unoccupied indication at the control office for the approach section at the left-hand end of the stretch of track.

Similarly, at the right-hand end of the stretch, the relay 8AAR (see Fig. 2D) is maintained picked up by its stick circuit upon the shifting of contact 208 of relay 7FR until the relay 8BAR has been picked up in response to the transmission of a driven code from left to right in the track section 6–7T. The stick circuit by which the relay 8AAR is maintained energized extends from (+) including contact 208 of relay 7FR in its left-hand position, back contact 209 of relay 8BAR, front contact 210 of relay 8AAR, and winding of relay 8AAR, to (—). Upon the picking up of relay 7H in response to the driven code transmitted from left to right in the track section 6–7T, the relay 8BAR is picked up upon the closure of front contact 211, and the picking up of that relay opens the stick circuit which has been described for relay 8AAR at back contact 209 to provide for the dropping away of that relay.

Having thus considered specifically the mode of operation of the system upon changing the direction of traffic, consideration will now be given to the mode of operation of the system upon the application of steady energy to the track rails of one of the track sections in the stretch of track as could be made effective by a signal maintainer in testing or adjusting the operating characteristics of the track circuits.

Assuming the direction of traffic to be set up for east bound traffic, with driven code transmitted from right to left in the respective track sections of the stretch of single track, it will be further assumed that steady energization is applied in the field at an intermediate point so as to cause the steady energization of the respective track sections to become effective to shift the contacts of the magnetic-stick traffic direction relays FR at the intermediate signal locations, and at the exit end of the stretch, according to the last established direction of traffic. The steady energization thus applied to the track rails, even though it is applied to the track rails of track section 2–3T, cannot cause the shifting of the contacts of relay 2FR (see Fig. 2A) at the left-hand end of the stretch because such relay is already in the position which it is operated by steady energization applied to the track rails of track section 2–3T.

The shifting of the contacts of relay 7FR (see Fig. 2D) at the right-hand end of the stretch is effective to cause the transmission of an indication to the control office in a manner which has been described for shifting the contacts of relay 3FK (see Fig. 1) to their left-hand positions and thereby cause the initiation of a cycle of operation for the transmission of controls to field station No. 2. Upon the picking up of relay LC2 at the beginning of the transmission of that cycle of operation, the relay 3FPS is picked up in a manner which has been described, and the picking up of that relay selects an (SL) code character for transmission to field station No. 2 during the cycle of operation as a traffic control code which has been described as a character being effective to energize the relay 2FZ (see Fig. 2A) with a polarity to cause that relay to be dropped away. Inasmuch as the relay 2FZ is already dropped away, it merely remains in that position, and the traffic direction relay 2FR is not affected by the control cycle, and also the relay 2CP remains inactive because of its circuit being open for the transmission of driven codes at contact 142 of relay 2FR in its left-hand position.

It is therefore provided that even though the traffic direction relays are positioned in response to the steady energization of the track rails abnormally, and such steady energization is effective to transmit an unoccupied indication to the control office, such indication is merely effective to call the attention of the dispatcher to the condition by the energization of the out-of-correspondence lamp CFK, and although a cycle of operation is initiated for transmission to field station No. 2, such cycle of operation cannot be effected to render the driven code transmitter relay 2CP active at that field station because there has been no control transmitted previously for picking up the relay 2FZ and thereby shifting the contacts of the relay 2FR to their left-hand positions.

When a dispatcher has his attention called to such a condition by the illumination of the outof-correspondence lamp CFK, he can proceed by operation of the button 1-8FB to set up traffic direction in response to manual designation in a manner corresponding to that which has been heretofore described.

*Indications.*—It is to be understood that the indications conventionally employed in a centralized traffic controlling system to facilitate the dispatching of trains are provided in accordance with the usual practice, even though certain of such indications have not been shown. The indications thus provided will include an indicator lamp controlled by a signal indication magnetic-stick relay GK at the control office for each signal control lever SGL (see Fig. 1), and they will also include lamps for indicating switch positions.

Although the circuits for the OS indicator lamps 1-2TE and 7-8TE are not shown in detail for the purpose of simplification of the disclosure of the present invention, it is to be understood that such lamps are controlled directly in accordance with the shifting of contacts of relays 1-2TK and 7-8TK respectively, or in any other suitable manner; and similarly, it is to be understood that the indicator lamps 2AE and 7AE are controlled in accordance with the operation of contacts of the magnetic-stick relays 2AK and 7AK respectively according to the usual practice.

It is desirable that the dispatcher be informed as to the condition when the apparatus in the field is out-of-correspondence with the traffic direction designated at the control office. An indication of such condition is provided by the out-of-correspondence indicator lamp CFK which is controlled so as to be initially energized upon the rotation of the button 1-8FB for initiating a change in the direction of traffic, and is maintained energized until the relays 2FK and 3FK have been properly positioned in accordance with the traffic direction change to indicate that the change has been effected at both ends of the stretch of single track. More specifically, assuming that the button 1-8FB has been rotated in a counter-clockwise direction for a change in traffic direction as has been described, a circuit is closed for the energization of the lamp CFK extending from (+) including contact 212 of button 1-8FB in its counter-clockwise rotated position, contact 213 of relay 2FK in its right-hand position, and the lamp CFK to (—). The transmission of an indication from the field station No. 2 that the traffic direction has been changed at that end of the stretch, is effective to operate the contacts of relay 2FK to their left-hand positions and thus open the circuit described for lamp CFK, but such lamp is maintained energized by a circuit extending from (+) including contact 212 of button 1-8FB in its counter-clockwise rotated position, contact 214 of relay 3FK in its right-hand position, and lamp CFK, to (—). By this circuit it is provided that the lamp CFK is maintained steadily energized until the steady energization has built up through each track section in the stretch of single track and has thus changed the traffic direction relays FR for such track sections, the traffic direction relay at the right-hand end of the stretch last conditioned being the relay responsible for the transmission of an indication to the control office effective to energize the magnetic-stick relay 3FK with a polarity to operate its contacts to their left-hand positions, and thereby open the circuit for the lamp CFK at contact 214 to provide for the extinguishing of that lamp. It is, therefore, provided that the lamp CFK is maintained energized until each traffic direction relay associated with the stretch of track between the passing sidings A and B is conditioned in correspondence with the traffic direction designated by the arrow included in the control button 1-8FB.

Having thus described a coded track circuit signalling system used in combination with centralized traffic control for a particular stretch of track as one embodiment of the present invention, it is desired to be understood that this form is selected to facilitate in the disclosure of the invention rather than to limit the number of forms which the invention may assume, and it is to be further understood that various adaptations, alterations, and modifications may be applied to the specific form shown to meet the requirements of practice, without in any manner departing from the spirit or scope of the present invention except as limited by the appended claims.

What I claim is:

1. In a coded track circuit signalling system for a stretch of track having entering signals governed from a control office by a code communication system, manually operable means at the control office for designating a traffic direction control for transmission by said code communication system to one end of said stretch, means at said one end of said stretch responsive to said manual control means for applying steady energy to the track rails, means at the other end of said stretch distinctively responsive to the steady energization of the track rails for rendering said code communication system active for the transmission of an indication to the control office that the stretch is unoccupied, and means at the control office automatically effective in response to the reception of an indication that the stretch is unoccupied to render said code communication system active for the transmission of a control to restore said means at one end, and thereby remove the steady energization from the track rails at that end.

2. In a coded track circuit signalling system, the combination with signals governing entrance to the opposite ends of a stretch of track controlled by a code communication system from a control office, of manually operable means at the control office for designation of traffic direction controls for transmission by said code communication system to the entrance end of said stretch for a given direction of traffic, track circuit code transmitting apparatus at said entrance end of said stretch effective when rendered active to selectively steadily energize the track rails or apply a driven code to the track rails, traffic direction control means at said entrance end of said stretch responsive to said manually operable means at the control office for rendering said code transmitting apparatus effective to steadily energize the track rails and condition said code transmitting apparatus so that it can be rendered active to transmit a driven code when the condition of steady energization of the track rails is terminated, and means including said code communication system effective in response to the reception of steady energization of the track rails at the opposite end of the stretch for restoring said traffic direction control means at said entrance end and thereby render said track circuit code transmitting apparatus inactive to steadily energize the track rails and active to transmit a driven code.

3. In a centralized traffic control signalling system for a stretch of track having an entering signal at each end governed by a code communication system from a control office, manually operable means at the control office for designation of the respective directions of traffic to be established through said stretch, track circuit code transmitting and receiving apparatus at each end of said stretch, said track circuit code transmitting apparatus being active at the exit end of said stretch in correspondence with said manual control means, but being rendered inactive in response to steady energization transmitted through the track rails from the opposite end of said stretch, said code transmitting apparatus at the opposite end of said stretch being rendered effective to steadily energize the track rails at that end in response to the manual designation at the control office of the opposite direction of traffic to be established, indication means including said code communication system for indicating at the control office each time a condition of steady energization is received at either end of said stretch, and means at the control office for automatically initiating said code communication system into a cycle of operation for the transmission of a control to remove the condition of steady energization from the track rails at either end of said stretch in response to the communication by said indication means of an indication that a condition of steady energization is received at the opposite end of said stretch.

4. In a coded track circuit signalling system for a stretch of track divided into a plurality of adjoining track sections and having signals at the ends of the stretch governed from a control office by a code communication system, manually operable control means at the control office for designation of traffic direction controls for transmission to one end of said stretch, track circuit code transmitting apparatus at said one end of said stretch and at a corresponding end of each of said track sections effective when rendered active to selectively steadily energize the track rails at that end or apply a driven code to the track rails, traffic direction control means at said one end of said stretch responsive to said manually operable means at the control office for rendering said code transmitting apparatus effective to steadily energize the track rails, said traffic direction control means being effective to render said track circuit code transmitting apparatus active to transmit a driven code when the condition of steady energization of the track rails is terminated, traffic direction control means at said corresponding end of each of said track sections responsive to the steady energization of the track rails of the adjoining track section for rendering said code transmitting apparatus effective to steadily energize the track rails of that track section and for rendering said track circuit code transmitting apparatus active to transmit a driven code upon the removal of steady energy from the track rails of said adjoining track section, and means including said code communication system effective in response to the reception of steady energization of the track rails at the opposite end of the stretch for restoring said traffic direction control means at said one end and thereby initiating the tumble-down of steady energization in the respective track sections, thus rendering said code transmitting apparatus active to transmit a driven code.

5. In a coded track circuit signalling system of the character described for a stretch of track having an entering signal at each end governed by a code communication system from a control office, a traffic direction relay at each end of said stretch having first and second positions, a traffic change relay at each end of said stretch having first and second positions, manually operable means at the control office for designation of the respective directions of traffic to be established, track circuit code transmitting apparatus at each end of said stretch for applying driven code pulses to the track rails, said apparatus being rendered active to transmit driven codes when said traffic direction relay and said change relay are in said first positions, and said apparatus being rendered active to steadily energize the track rails when said traffic direction relay is in said first position and said traffic change relay is in said second position, means at the control office including said code communication system effective in response to the manual designation of a change in traffic direction by said manually operable means for operating said change relay to said first position at the entrance end of the route last established and for operating said traffic direction relay at that end to said first position and thereby cause the steady energization of the track rails, code receiving means at each end of said stretch distinctively responsive to steady energization of the track rails for operating said traffic direction relay to said second position and thereby render said code transmitting apparatus at that end of the stretch inactive for the transmission of driven codes and effect the communication by said communication system of an indication to the control office that the stretch is unoccupied, and means at the control office for each end of the stretch distinctively responsive to the communication of an indication that said traffic direction relay is in said second position at the corresponding end of the stretch for automatically effecting the initiation of said communication system to operate said traffic change relay at the opposite end of said stretch to said first position and thereby terminate the steady energization of the track rails by said track circuit code transmitting apparatus at that end and render that track section code transmitting apparatus active to transmit a driven code.

6. In a centralized traffic control system, the combination with a stretch of track having a plurality of signals for a given direction of traffic with traffic direction control means at each intermediate signal location to determine the direction of code transmission and a code communication system connecting a control office with each end of the stretch, of a manually operable device at the control office, means including said code communication system effective in response to said manually operable device to steadily energize the track rails at one end of said stretch and thereby conditioning said traffic direction means at each signal location, and means including said code communication system and a device at the opposite end of said stretch for automatically moving said steady energy from the track rails in response to the reception of steady energy through the track rails at said opposite end.

7. In a coded track circuit signalling system for railroads, the combination with a stretch of track having a plurality of signals for a given direction of traffic, traffic direction means at each intermediate signal location to determine the direction of track circuit code transmission, and a code communication system connecting a control office with each end of the stretch, of a manually operable device at the control office for designation of the direction of traffic to be established, means including said code communication system responsive to said manually operable means for applying steady energy to one end of said stretch and thereby condition said traffic direction means at each signal location, and means including said code communication system and a device at the opposite end of said stretch for maintaining steady energy applied at said one end until the stretch is unoccupied by a train, said means being effective to remove the condition of steady energization at said one end and allow the transmission of track circuit codes at that end in response to the reception of steady energization in the track rails at said opposite end.

8. In a coded track circuit signalling system for a stretch of track having track circuit code transmitting apparatus and signals at its opposite ends governed over a code communication system from a remote control office, traffic direction control means at each end of said stretch effective to maintain said code transmitting apparatus effective to transmit code for a given direction of traffic until restored by an application of steady energy to the track rails at the opposite end of said stretch and thereby leave track circuit code on the stretch for the last established direction of traffic, manually operable control means at the control office, means responsive to said manual control means and including said code communication system for applying steady energy to the track rails at the end of the stretch having its code transmitting apparatus inactive and thereby to oppose in the track rails the track circuit code being transmitted from the opposite end of the stretch, and means including said code communication system and a device in the field responsive to the feeding of steady energy through the track rails from the opposite end of the stretch for automatically removing the condition of steady energization from the track rails and rendering said track circuit code transmitting apparatus active at the end at which the steady energy has been applied.

9. In a coded track circuit signalling system for a stretch of single track comprising a plurality of track sections and having signals at its ends governed by a communication system from a remote control office, separate indicating means at said control office for indicating occupancy of different track sections of said stretch, driven and inverse code transmitting and receiving apparatus associated with each track section, means including said communication system and said code transmitting and receiving apparatus for governing said indication means at the control office to provide indications of the movement of trains into and out of said track sections, traffic direction control means at each end of said stretch manually controlled from the control office for rendering said code transmitting apparatus at that end effective to steadily energize the track rails, means including a device at each end of the stretch and said communication system actuated in response to the reception of steady energization of the track rails at one end of said stretch for rendering said traffic direction control means at the opposite end inactive for applying steady energy to the track rails and rendering the code transmitting apparatus active at that end of the stretch to transmit a driven code, and means for preventing said indication means from indicating track occupancy when the track rails of said stretch are steadily energized.

10. In a centralized traffic control system for railroads of the character described, the combination with a stretch of track having a plurality of track sections and driven and inverse code transmitting and receiving apparatus associated with each track section, of separate indicating means associated with the end track sections of said stretch, separate relay means responsive to respective driven and inverse codes at each end of said stretch for controlling said indication means at the associated end of the stretch, a manually controlled traffic direction device at each end of said stretch for determining the direction of transmission of driven and inverse codes, and circuit means governed by said traffic direction device for maintaining each of said relay means in a condition last actuated by track circuit code upon reversal of traffic direction until the opposite direction of track circuit code transmission is established and thereby prevent a change in said indication means upon a reversal in the direction of traffic.

11. In a coded track circuit signalling system for a stretch of track having a plurality of track sections and driven and inverse code transmitting and receiving apparatus associated with each track section, separate indication means associated with the end track sections of said stretch, separate relay means responsive to respective driven and inverse codes at each end of said stretch for controlling said indication means at the associated end of the stretch, a traffic direction device at each end of said stretch for determining the direction of transmission of track circuit codes, circuit means governed by said traffic direction device for maintaining each of said relay means in a condition last actuated by track circuit code during reversal of traffic direction until the opposite direction of track circuit code transmission is effective in response to the shifting of said traffic direction device, and means involving a sustained energization of the track rails of the respective track sections of said stretch for operating said traffic direction devices.

12. In a signalling system for railroads of the character described for a stretch of track divided into a plurality of track sections and having signals for governing traffic through each track section in both directions, means for applying steady energy to the track rails at either end of said stretch for reversing the direction of traffic, a traffic direction relay at each intermediate signal location actuated in response to the steady energization of the track rails in either adjoining track section to select the direction of driven code transmission for that signal location, a stick relay at each intermediate signal location picked up only by the reception of track circuit code transmitted through the track rails from another signal location, stick circuit means for maintaining said stick relay energized upon the reception of track circuit code but acting to deenergize said stick relay in response to the reception of steady energization in the track rails at that signal location, and track circuit code transmitting means at each of said intermediate signal locations rendered active for the transmission of track circuit codes only when said stick relay is energized.

13. In a centralized traffic control system for railroads for a stretch of track having track circuit code transmitting and receiving apparatus for both directions of traffic, means including a traffic direction control relay at each end of said stretch for establishing track circuit code transmission for either direction of traffic, a code communication system connecting a control office with each end of said stretch and operable during a control cycle of operation to transmit a selected code element on a particular step of the code communication system, a manually operable device at the control office for designating a change in traffic direction and initiating a control cycle of operation of said communication system, said manually operable device being effective when actuated to select a particular distinctive code element for transmission to one end of said stretch during said particular step, and means at the control office effective in response to the reception of an indication from the opposite end of said stretch that the stretch is unoccupied for automatically initiating a control cycle of operation and selecting another distinctive code element for transmission to said opposite end of said stretch.

14. In a coded track circuit signalling system for a stretch of track divided into a plurality of track sections and having signals governing train movement through each track section in either direction controlled by the direction of transmission of track circuit code, traffic direction control means at each end of said stretch actuated in accordance with the direction of traffic established through said stretch, means including manually operable contact means at a control office and a code communication system for causing a change in said traffic direction means, means at each end of said stretch for causing a change in said traffic direction means in response to the reception of steady energization in the track rails at that end of the stretch, separate indicating devices at the control office positioned by said traffic direction means at the respective ends of said stretch, and an indicator lamp at the control office energized whenever either of said indication devices is out of correspondence with said manually operable traffic direction control means.

THOMAS J. JUDGE.

REFERENCES CITED

The following references are of record in the file of this patent:

UNITED STATES PATENTS

| Number | Name | Date |
| --- | --- | --- |
| 2,344,333 | Van Horn | Mar. 14, 1944 |
| 2,366,776 | Failor | Jan. 9, 1945 |
| 2,387,152 | Jerome et al. | Oct. 16, 1945 |
| 2,390,010 | Talbert et al. | Nov. 27, 1945 |
| 2,395,706 | Young | Feb. 26, 1946 |
| 2,422,127 | Pascoe et al. | June 10, 1947 |
| 2,430,291 | Hays | Nov. 4, 1947 |